US011313606B2

(12) United States Patent
Park et al.

(10) Patent No.: US 11,313,606 B2
(45) Date of Patent: Apr. 26, 2022

(54) REFRIGERATOR HAVING VERY LOW TEMPERATURE FREEZER COMPARTMENT

(71) Applicant: LG Electronics Inc., Seoul (KR)

(72) Inventors: Yoo Min Park, Seoul (KR); Myeongha Yi, Seoul (KR); Jinho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/927,669

(22) Filed: Jul. 13, 2020

(65) Prior Publication Data

US 2020/0340731 A1    Oct. 29, 2020

Related U.S. Application Data

(63) Continuation of application No. 15/862,322, filed on Jan. 4, 2018, now Pat. No. 10,731,913.

(30) Foreign Application Priority Data

Jan. 4, 2017   (KR) .................. 10-2017-0001595

(51) Int. Cl.
*F25D 17/06*    (2006.01)
*F25D 11/02*    (2006.01)
(Continued)

(52) U.S. Cl.
CPC ............ *F25D 17/065* (2013.01); *F25B 21/02* (2013.01); *F25D 11/02* (2013.01); *F25D 11/025* (2013.01);
(Continued)

(58) Field of Classification Search
CPC ...... F25D 17/065; F25D 11/02; F25D 23/069; F25D 23/062; F25D 25/025;
(Continued)

(56) References Cited

U.S. PATENT DOCUMENTS 6,484,512 B1   11/2002 Anderson et al.
2010/0127608 A1* 5/2010 Kitamura .............. F25D 11/003
312/406.1

(Continued)

FOREIGN PATENT DOCUMENTS

EP      2423626      2/2012
EP      2530408      12/2012
(Continued)

OTHER PUBLICATIONS

European Extended Search Report in European Application No. 18150132.1, dated Jul. 19, 2018, 9 pages.
(Continued)

*Primary Examiner* — Steve S Tanenbaum
(74) *Attorney, Agent, or Firm* — Fish & Richardson P.C.

(57) ABSTRACT

A refrigerator that includes: a storage space configured to be cooled by a refrigeration cycle cooling system; a wall defines a boundary of the storage space; a low temperature case that is arranged adjacent to a portion of a first surface of the wall; a thermoelectric element module (TEM) assembly that is configured to supply cool air to the low temperature case; and a TEM accommodating part that protrudes from the first surface of the wall and that accommodates the TEM assembly, wherein the low temperature case includes an opening through which the TEM accommodating part is inserted, and wherein a sealant is provided between the low temperature case and the wall to couple the low temperature case to the first surface of the wall is disclosed.

19 Claims, 30 Drawing Sheets

(51) Int. Cl.
  *F25D 23/06*    (2006.01)
  *F25B 21/02*    (2006.01)
  *F25D 23/08*    (2006.01)
  *F25D 25/02*    (2006.01)
  *F25B 5/02*     (2006.01)

(52) U.S. Cl.
  CPC ......... *F25D 23/062* (2013.01); *F25D 23/069* (2013.01); *F25D 23/087* (2013.01); *F25D 25/025* (2013.01); *F25B 5/02* (2013.01); *F25B 2321/023* (2013.01); *F25B 2321/0251* (2013.01); *F25B 2341/062* (2013.01); *F25D 2317/061* (2013.01); *F25D 2323/021* (2013.01); *Y02B 40/00* (2013.01)

(58) Field of Classification Search
  CPC ......... F25D 2317/061; F25D 2323/021; F25D 11/025; F25D 23/087; F25D 2700/122; F25D 21/08; F25D 19/04; F25B 2321/0251; F25B 2341/062; F25B 5/02; F25B 2321/023; F25B 21/02; F25B 21/04; Y02B 40/34; H01L 35/00; H01L 37/00

USPC ......................................................... 62/441
  See application file for complete search history.

(56) References Cited

U.S. PATENT DOCUMENTS

2012/0304667 A1* 12/2012 Shin .................... F25D 11/025
                                                    62/3.6
2013/0207530 A1   8/2013  Yeo et al.
2014/0021838 A1   1/2014  Jung et al.

FOREIGN PATENT DOCUMENTS

| EP | 3109581 | 12/2016 |
| JP | 2005257208 | 9/2005 |
| WO | WO2009125922 | 10/2009 |
| WO | WO2011060503 | 5/2011 |
| WO | WO2016129906 | 8/2016 |

OTHER PUBLICATIONS

Office Action in European Appln. No. 18150132.1, dated Oct. 4, 2021, 5 pages.

* cited by examiner

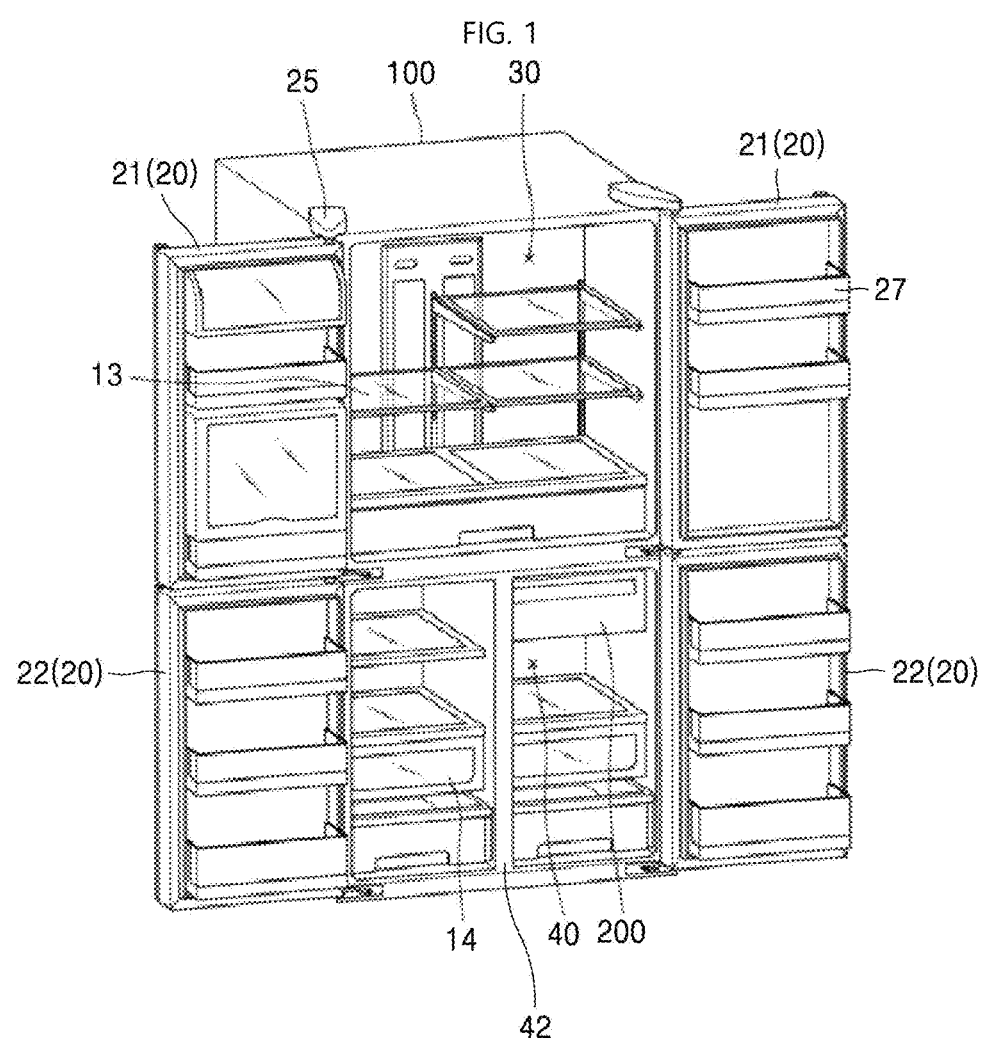

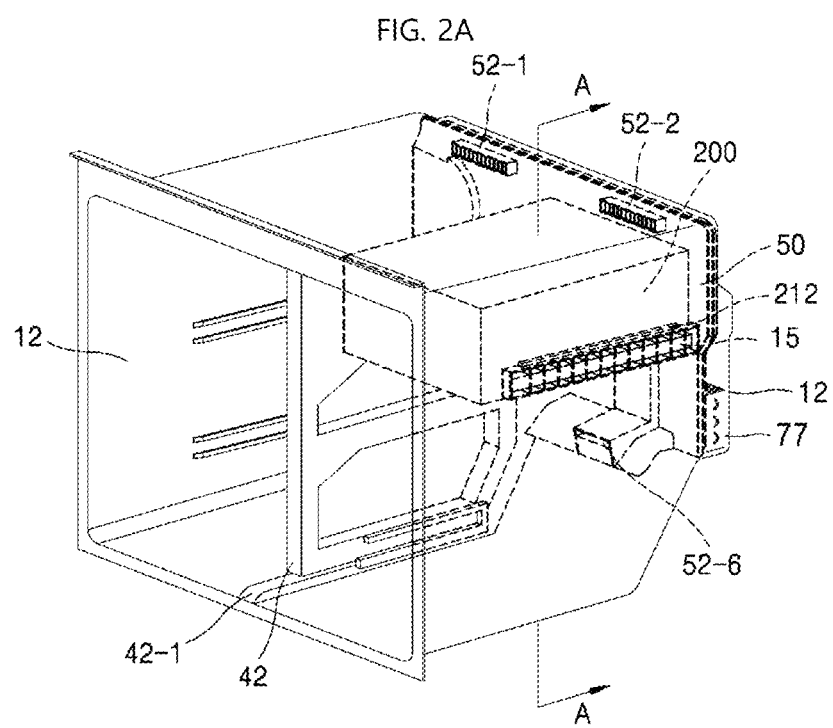

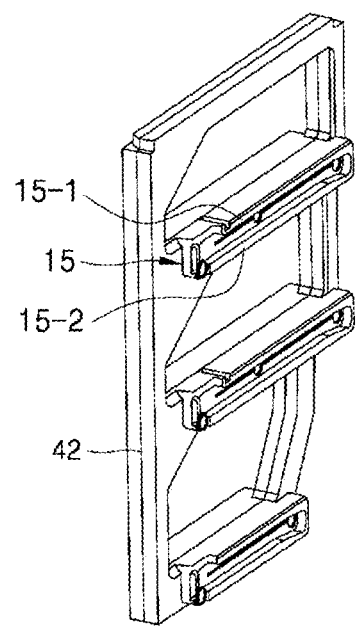

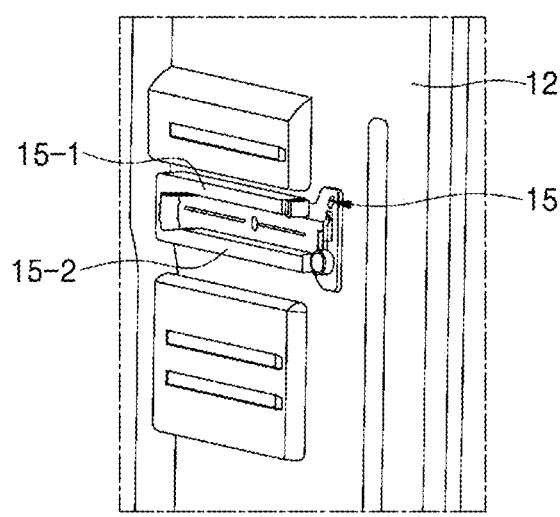

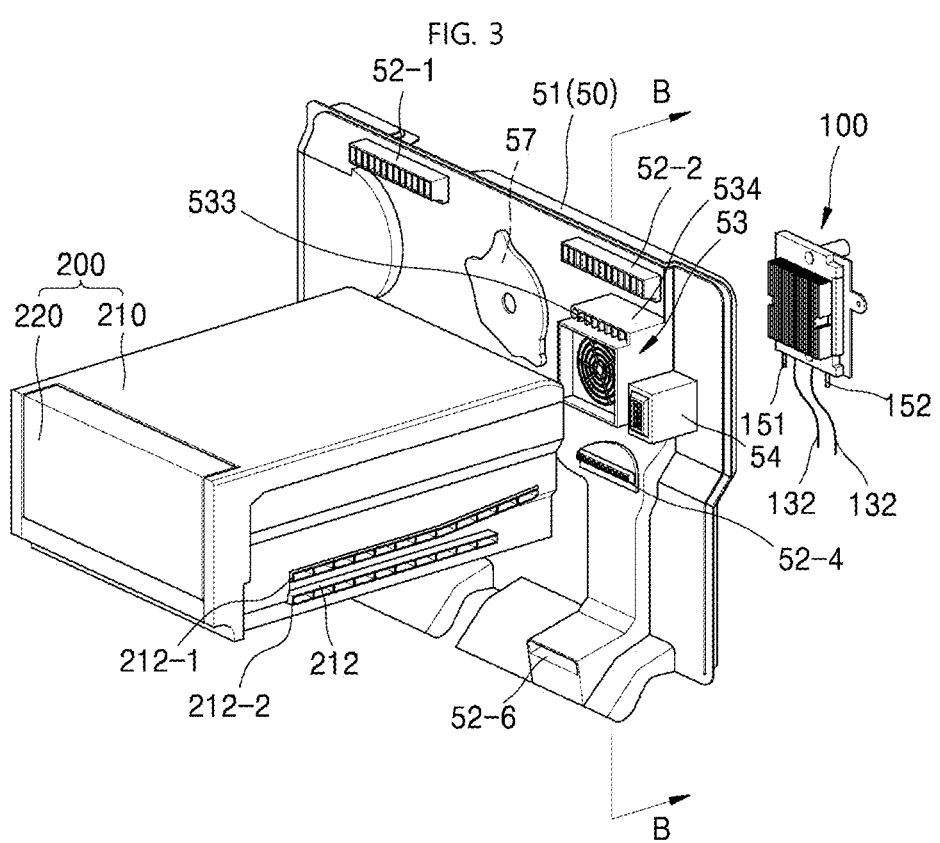

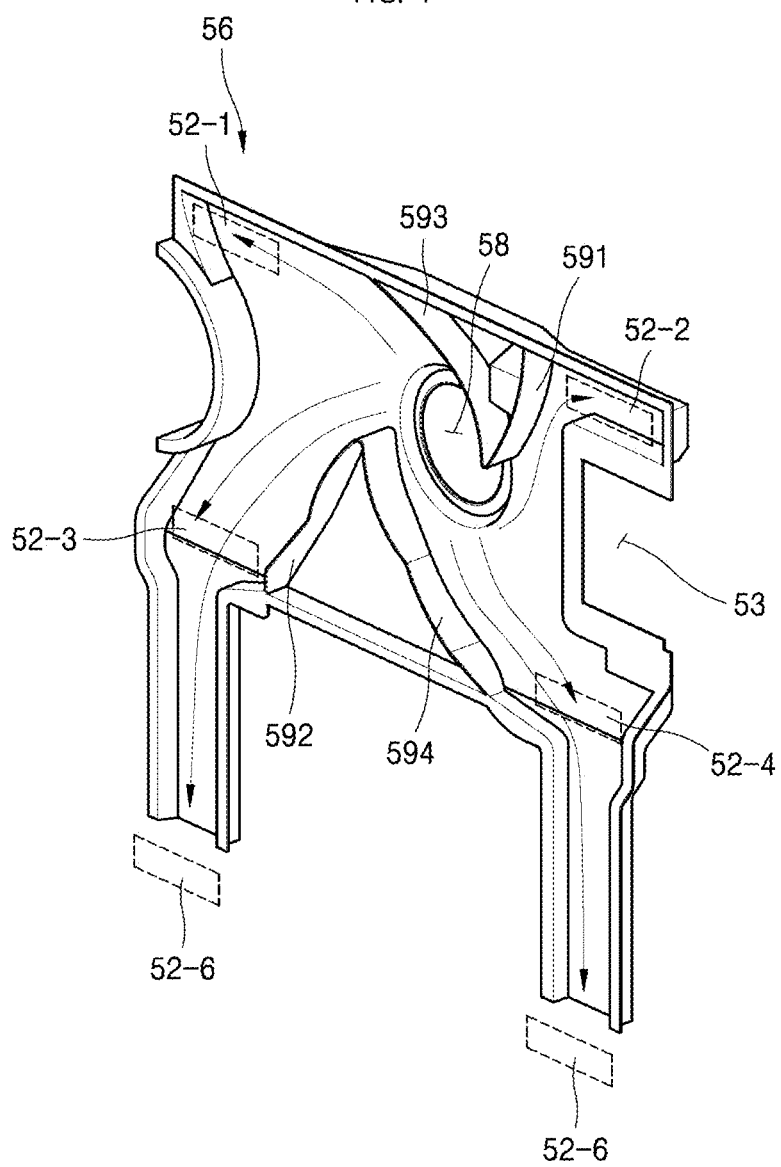

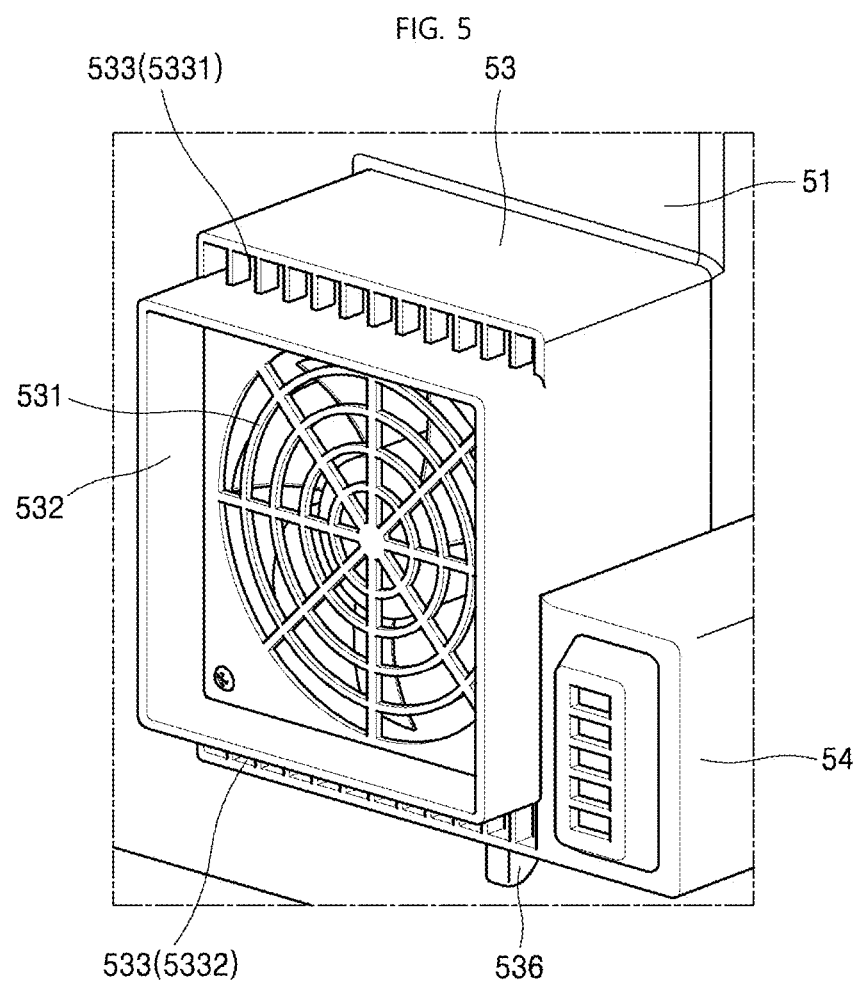

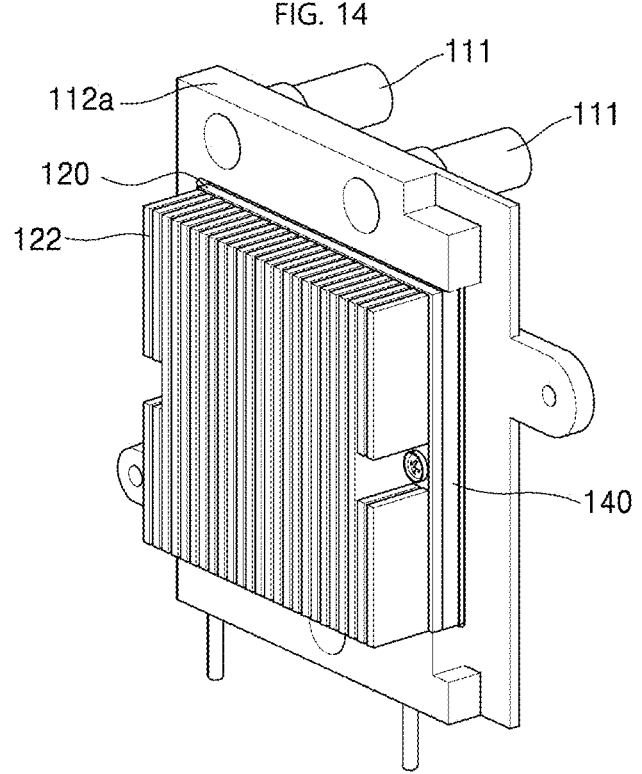

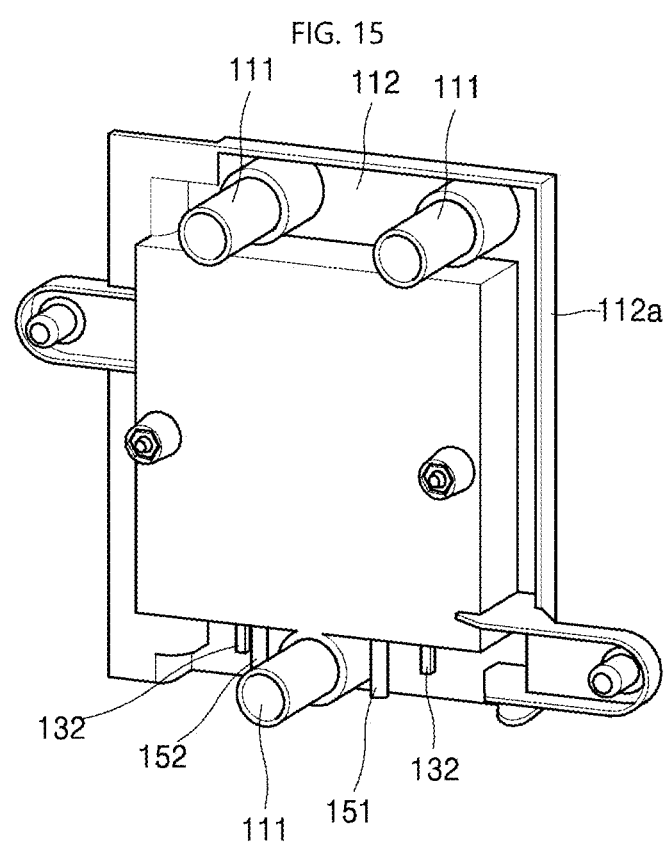

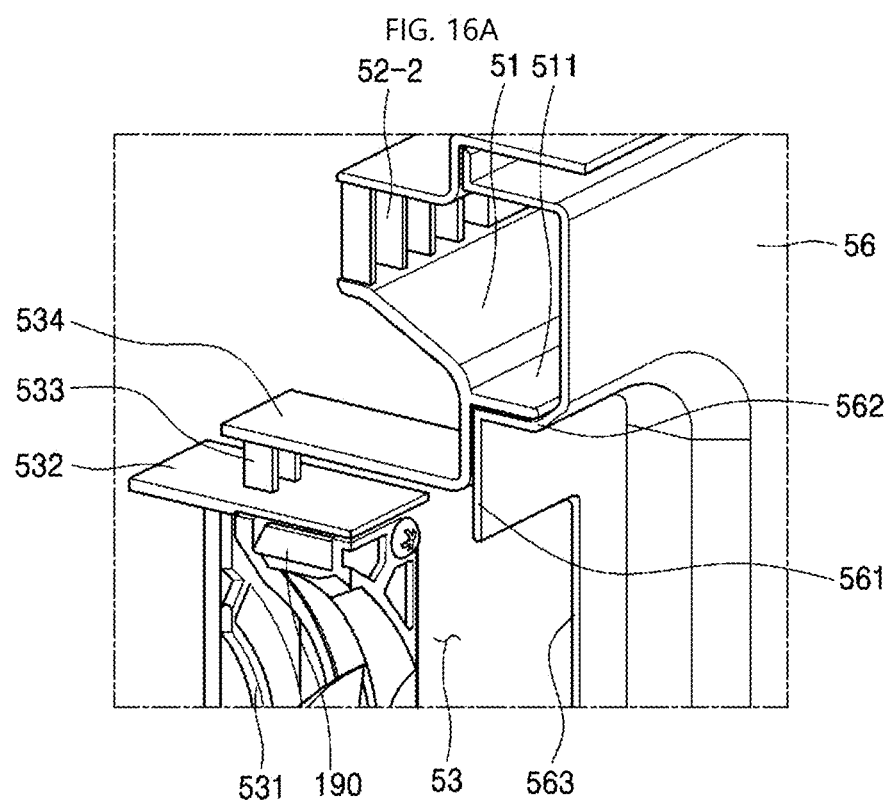

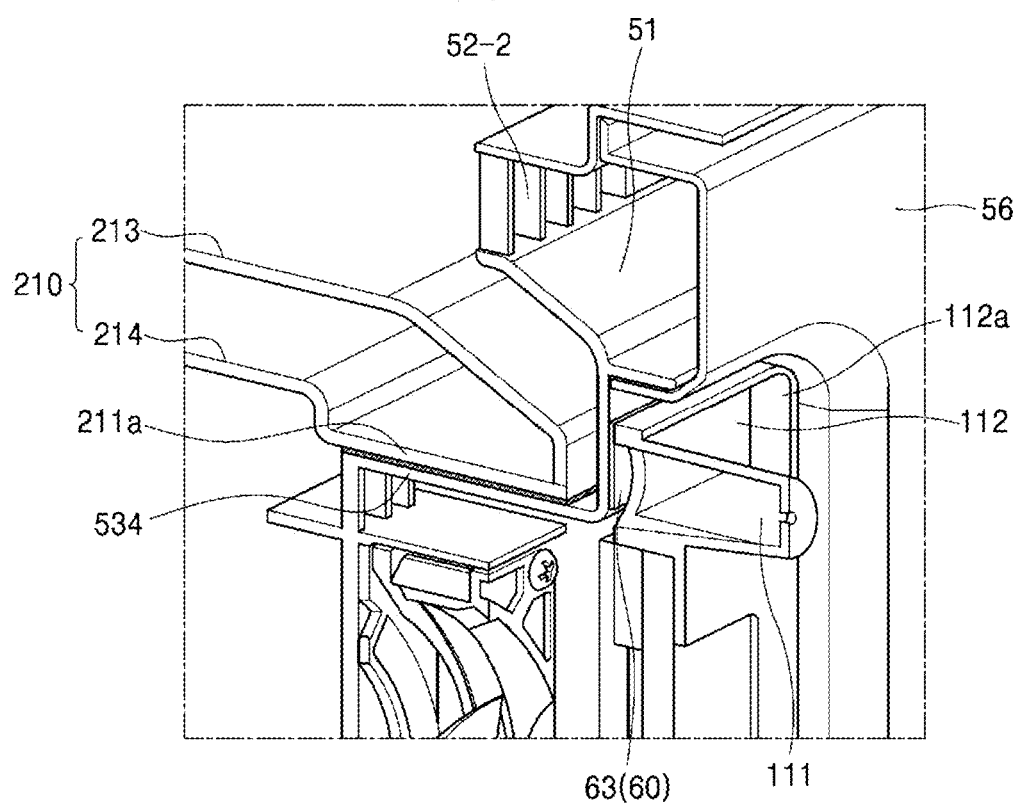

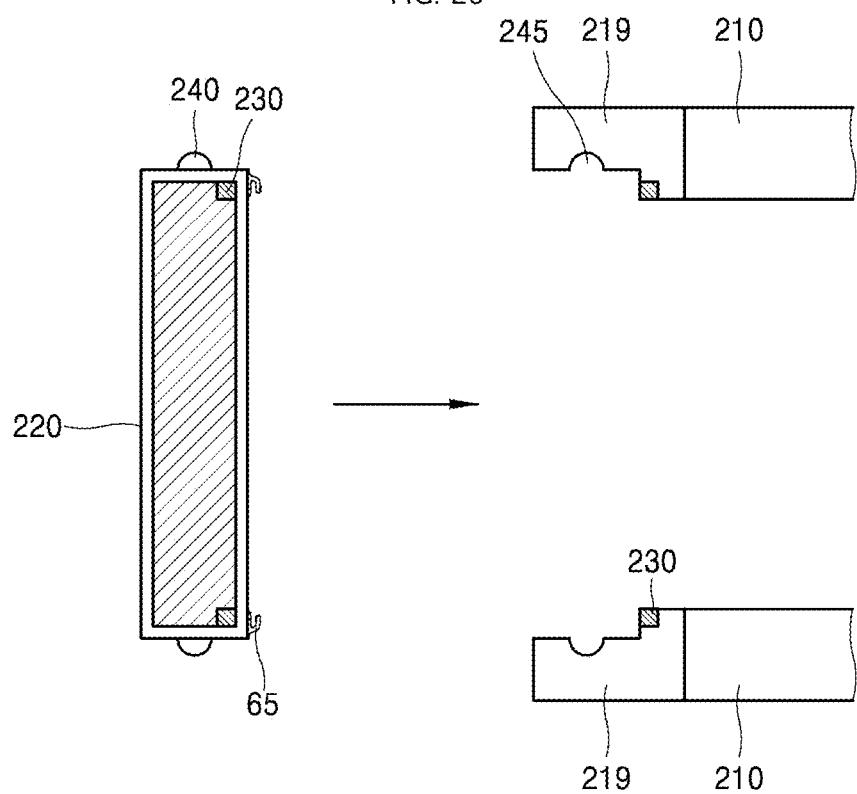

REFRIGERATOR HAVING VERY LOW TEMPERATURE FREEZER COMPARTMENT

CROSS-REFERENCE TO RELATED APPLICATIONS

This application is a continuation of U.S. application Ser. No. 15/862,322, filed on Jan. 4, 2018, which claims priority to and the benefit of Korean Patent Application No. 10-2017-0001595, filed on Jan. 4, 2017, the disclosures of which are incorporated herein by reference in their entirety.

BACKGROUND

1. Field of the Invention

The present invention relates to a refrigerator having a very low temperature freezer compartment, and more particularly, to a refrigerator for reliably preventing leakage of cool air in a very low temperature freezing space to the outside and allowing a very low temperature freezer compartment and a thermoelectric element module (TEM) assembly to be easily installed.

2. Discussion of Related Art

Generally, a refrigerator is a home appliance that stores food at a low temperature, and can be divided into a refrigerator compartment and a freezer compartment according to a temperature of food stored in the refrigerator. Generally, a refrigerator compartment maintains a temperature of 3 to 4° C., and a freezer compartment maintains a temperature of about −20° C.

The freezer compartment having a temperature of about −20° C. is a space in which food is kept frozen and is mainly used by consumers to store food for long periods of time. However, an existing freezer compartment which maintains a temperature of about −20° C. has a problem in that, in a case in which meat or seafood are frozen, when moisture in cells of the meat or seafood is frozen, a phenomenon in which the moisture is drained outside the cells and the cells are destroyed occurs, and as a result, when the meat or seafood are cooked after being defrosted, an original taste thereof is lost or a texture is changed.

On the other hand, in the case of meat or seafood being frozen, when the freezing is performed while a temperature rapidly passes through a freezing point temperature zone in which intracellular ice is formed, destruction of the cells can be minimized. Therefore, even after the meat or seafood is defrosted, fleshiness and texture of the food can be properly renewed or reproduced, and thus delicious dishes can be made.

Because of this, high-class restaurants use very low temperature freezers that can rapidly freeze meat, fish, seafood, and the like. However, since it is not always necessary to use a very low temperature freezer in an ordinary home unlike a restaurant that needs to preserve large quantities of food, it is not easy to separately purchase and use a very low temperature freezer that is used in a restaurant.

However, as quality of life has improved, a customer's desire to eat more delicious food has increased, and accordingly, customers who want to use a very low temperature freezer have increased.

In order to meet the needs of such customers, household refrigerators in which a very low temperature freezer compartment is installed in a portion of a freezer compartment are being developed. The very low temperature freezer compartment preferably satisfies a temperature of about −50° C., and such an extremely low temperature is a temperature that cannot be attained by only a refrigeration cycle using a conventional refrigerant.

Accordingly, household refrigerators in which a very low temperature freezer compartment is separately provided in a freezer compartment are being developed through a method in which cooling is performed up to a temperature of about −20° C. using a refrigeration cycle and then cooling is performed at a very low temperature lower than −20° C. using a TEM.

However, since a temperature difference between a freezer compartment at −20° C. and a very low temperature freezer compartment at −50° C. is significantly large, it is not easy to implement the temperature of −50° C. only by directly applying a structure in which heat insulating, defrosting, and cold air supplying are performed, which has been applied to an existing freezer compartment design, to the very low temperature freezer compartment.

Therefore, in order to smoothly implement an extremely low temperature of the very low temperature freezer compartment, it is necessary to block introduction of air in the freezer compartment at a temperature of −20° C., which is higher than −50° C., into a very low temperature freezing space which maintains a temperature of −50° C. inside the very low temperature freezer compartment.

A very low temperature case forming the very low temperature freezer compartment should be manufactured and assembled separately from a grill fan assembly, and a very low temperature compartment door that can open and close the very low temperature case should be installed on a front side of the very low temperature case. Therefore, an assembled structure of the very low temperature case and the grill fan assembly should have a structure in which the very low temperature case is firmly fixed to the grill fan assembly and introduction of air in the freezer compartment into an inner space of the very low temperature case through such fixed portions is prevented, and is required to have a structure in which the air in the freezer compartment is also prevented from being introduced into the inner space of the very low temperature case even through a gap between the very low temperature case and the very low temperature compartment door.

Since an assembly including a thermoelectric element installed for cooling the very low temperature freezing space of the very low temperature freezer compartment is installed in the grill fan assembly, when a gap existing at a fastening portion of the assembly of the thermoelectric element and the grill fan assembly is a portion at which the very low temperature freezing space is in conjunction with a general freezing space, a structure for preventing introduction of air in the freezer compartment into an inner space of the very low temperature case, that is, a sealing structure, is required therebetween.

In addition, even when a gap between the grill fan and a shroud of the grill fan assembly in which the assembly of the thermoelectric element is installed is the portion at which the very low temperature freezing space is in conjunction with the general freezing space, the structure for preventing the introduction of the air in the freezer compartment into the inner space of the very low temperature case, that is, the sealing structure, is required therebetween.

SUMMARY

The present invention is directed to a refrigerator structure in which an extremely low temperature is smoothly implemented and maintained by all gaps around a very low temperature freezing space through which it is possible for a very low temperature freezing space to be in conjunction with a freezing space of a general freezer compartment being thoroughly sealed.

The present invention is directed to a refrigerator having a structure in which a TEM assembly is easily assembled and also reliably sealed.

The present invention is directed to a refrigerator further including a compression structure in which sealing can be reliably performed even between a very low temperature case which is opened and closed and a very low temperature compartment door.

In general, one innovative aspect of the subject matter described in this specification can be implemented in a refrigerator comprising: a storage space configured to be cooled by a refrigeration cycle cooling system; a wall that is located at a first side of the storage space and that is configured to define a boundary of the storage space at a first side of the storage space; a low temperature case that is located in the storage space and that is arranged adjacent to a portion of a first surface of the wall, the first surface facing the storage space; a TEM assembly that is located at a first side of the low temperature case, that is coupled to a portion of a second surface of the wall, the portion of the second surface corresponding to the portion of the first surface of the wall, and that is configured to supply cool air to the low temperature case; and a TEM accommodating part that protrudes from the first surface of the wall and that accommodates the TEM assembly, wherein the low temperature case includes an opening through which the TEM accommodating part is inserted, and wherein a sealant is provided between the low temperature case and the wall to couple the low temperature case to the first surface of the wall.

The foregoing and other implementations can each optionally include one or more of the following features, alone or in combination. In particular, one implementation includes all the following features in combination. An inner circumferential surface of the opening of the low temperature case surrounds an outer circumferential surface of the TEM accommodating part, and wherein a sealant is applied between the inner circumferential surface of the opening of the low temperature case and the outer circumferential surface of the TEM accommodating part to couple the inner circumferential surface of the opening of the low temperature case to the outer circumferential surface of the TEM accommodating part. A peripheral surface of the opening contacts a peripheral surface of the TEM accommodating part, and wherein a sealant is applied between the peripheral surface of the opening and the peripheral surface of the TEM accommodating part to couple the peripheral surface of the opening to the peripheral surface of the TEM accommodating part. The inner circumferential surface of the opening includes a surface inclined outwardly toward the wall, wherein the outer circumferential surface of the TEM accommodating part includes a surface inclined outwardly toward the wall, and wherein the surface of the inner circumferential surface is inclined at the same angle as the surface of the outer circumferential surface. A portion of the inner circumferential surface overlaps with the outer circumferential surface, and wherein a length of the portion of the inner circumferential surface is between 30 and 40 mm. The refrigerator further comprises: a low temperature compartment door that is configured to open or close an opening of the low temperature case, the opening being located at a second side of the storage space; and a gasket that is configured to shield a gap between the low temperature compartment door and the low temperature case. The refrigerator further includes: a compression structure that is configured to compress the gasket using a force applied to close the low temperature compartment door. The compression structure includes: a first magnetic unit that is coupled to the low temperature compartment door, and a second magnetic unit that is coupled to the low temperature case, and wherein the first magnetic unit and the second magnetic unit mutually attract each other. The compression structure includes: a protrusion that is coupled to the low temperature compartment door, and a locking groove that is coupled to the low temperature case and that is configured to be engaged with the protrusion. The refrigerator further includes: a low temperature tray that is coupled to the low temperature compartment door and that is movable between a first position and a second position, wherein, (i) in a state in which the low temperature tray is located at the first position, at least one portion of the low temperature tray is outside of the low temperature case, and (ii) in a state in which the low temperature tray is located at the second position, the low temperature tray is inside the low temperature case; an outer rail guide that is coupled to the low temperature tray through the low temperature compartment door and that is configured to be moved with the low temperature tray; and an outer rail that is coupled to the low temperature case and that is configured to guide the outer rail guide in moving the low temperature tray between the first position and the second position, wherein the compression structure includes a damping closure that is coupled to the outer rail or the outer rail guide and that is configured to move the outer rail guide at a first speed. The compression structure includes: a structure that is configured to press the low temperature compartment door in a state in which a refrigerator door of the refrigerator is closed.

In general, another innovative aspect of the subject matter described in this specification can be implemented in a water purifier comprising: a freezer compartment; a grill fan that is located at a first side of the freezer compartment; a low temperature case that is located at an interior area of the freezer compartment and that is arranged adjacent to a portion of a first surface of the grill fan; a TEM assembly that is located at a first side of the low temperature case, that is coupled to a first portion of a second surface of the grill fan, the first portion of the second surface corresponding to a portion the first surface of the grill fan, and that is configured to supply cool air to the low temperature case; a TEM accommodating part that is coupled to the grill fan and that accommodates the TEM assembly; and a shroud that is coupled to the grill fan, that is configured to distribute cool air supplied to the freezer compartment, and that includes (i) an abutting surface being coupled to a second portion of the second surface of the grill fan, the second portion of the second surface corresponding to the TEM accommodating part and (ii) a TEM insertion hole that is connected to an interior area of the TEM accommodating part, wherein a sealant is applied between the second surface of the grill fan and the abutting surface of the shroud to couple the shroud to the grill fan.

The foregoing and other implementations can each optionally include one or more of the following features, alone or in combination. In particular, one implementation includes all the following features in combination. The TEM assembly includes: a cold sink, a thermoelectric element, a heat insulating material, a heat sink, a module housing that is configured to accommodate and fix at least one of the cold sink, the thermoelectric element, the heat insulating material, and the heat sink, and a flange that is coupled to the module housing, that extends outwardly, and that is fixed to the grill fan by coupling to the abutting surface of the shroud, and wherein the cold sink, the thermoelectric element, and the heat sink are orderly arranged in a direction from a second side of the module housing to the first side of the module housing. A sealant is applied between the flange and the abutting surface to couple the TEM assembly to the grill fan. A portion of the flange is overlapped with the abutting surface, and wherein a length of the portion of the flange is between 5 and 15 mm. The TEM assembly includes: a cold sink, a thermoelectric element, a heat insulating material, a heat sink, a module housing that is configured to accommodate and fix at least one of the cold sink, the thermoelectric element, the heat insulating material, and the heat sink, a flange that is coupled to the module housing, that extends outwardly, and that is fixed to the grill fan by coupling to the abutting surface of the shroud, and a spacer that is coupled to the flange, that protrudes from the flange, that is supported by an inner case of the refrigerator, and that is configured to make a space between the grill fan and the inner case of the refrigerator, and wherein the cold sink, the thermoelectric element, and the heat sink are orderly arranged in a direction from a second side of the module housing to the first side of the module housing. The TEM assembly includes: a cold sink, a thermoelectric element, a heat insulating material, a heat sink, and a module housing that is configured to accommodate and fix at least one of the cold sink, the thermoelectric element, the heat insulating material, and the heat sink, wherein the cold sink, the thermoelectric element, and the heat sink are orderly arranged in a direction from a second side of the module housing to the first side of the module housing, and wherein the cold sink is located at a first side of the grill fan and the thermoelectric element and the heat sink are located at a second side of the grill fan. A first end of the cold sink is located adjacent to the grill fan.

In general, another innovative aspect of the subject matter described in this specification can be implemented in a water purifier comprising: a freezer compartment; a grill fan that is located at a first side of the freezer compartment; a low temperature case that is located at an interior area of the freezer compartment and that is arranged adjacent to a portion of a first surface of the grill fan; a TEM assembly that is located at a first side of the low temperature case, that is coupled to a first portion of a second surface of the grill fan, the first portion of the second surface corresponding to a portion the first surface of the grill fan, and that is configured to supply cool air to the low temperature case; a TEM accommodating part that is coupled to the grill fan and that accommodates the TEM assembly; a shroud that is coupled to the grill fan and that is configured to distribute cool air supplied to the freezer compartment; a rear rib that is coupled to the first surface of the grill fan and that extends outwardly from an outer periphery of the TEM accommodating part; and a rib abutting surface that is coupled to the shroud and that extends outwardly to be in contact with an inner surface of the rear rib, wherein a sealant is applied between the second surface of the grill fan and the rib abutting surface of the shroud to couple the shroud to the grill fan.

The foregoing and other implementations can each optionally include one or more of the following features, alone or in combination. In particular, one implementation includes all the following features in combination. The TEM assembly includes: a cold sink, a thermoelectric element, a heat insulating material, a heat sink, and a module housing that is configured to accommodate and fix at least one of the cold sink, the thermoelectric element, the heat insulating material, and the heat sink, wherein a portion of an outer edge of a flange that faces outwardly from the module housing of the TEM assembly is controlled by an inner surface of the rib abutting surface of the shroud such that the module housing is located relative to an abutting surface of the shroud, and wherein the cold sink, the thermoelectric element, and the heat sink are orderly arranged in a direction from a second side of the module housing to the first side of the module housing.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view illustrating a refrigerator according to the present invention in a state in which doors thereof are opened;

FIGS. 2A to 2C are perspective views illustrating a state in which a grill fan assembly and a very low temperature freezer compartment are installed in an inner case of a freezer compartment of a refrigerator main body of the present invention, a partition wall, and a side wall of the inner case, respectively;

FIG. 3 is a front perspective view illustrating a state in which the grill fan assembly, the very low temperature freezer compartment, and a TEM assembly of the freezer compartment according to the present invention are disassembled;

FIG. 4 is a perspective view illustrating a shroud of the grill fan assembly;

FIG. 5 is an enlarged perspective view of a TEM accommodating part;

FIG. 14 is a front perspective view illustrating a modified example of the TEM assembly according to the present invention;

FIG. 15 is a rear perspective view of the modified example of FIG. 14;

FIGS. 16A and 16B are cross-sectional views taken along line I-I of FIG. 6;

FIGS. 17A and 17B are enlarged perspective views of a portion J of FIG. 8 when viewed from the rear;

FIG. 26 illustrates cross-sectional views taken along lines Q-Q and R-R of FIG. 24.

DETAILED DESCRIPTION

Figure 6:
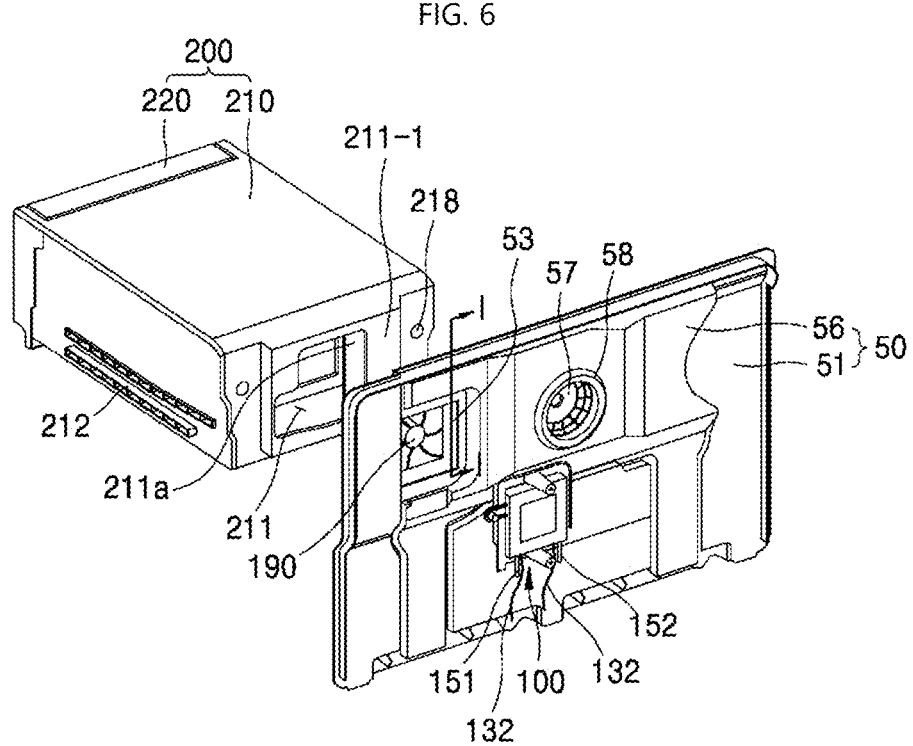
FIG. 6 is a rear perspective view of FIG. 3.

Hereinafter, exemplary embodiments of the present invention will be described in detail with reference to the accompanying drawings.

The present invention is not limited to the embodiments that will be disclosed, and may be implemented in various different forms. The embodiments are provided in order to fully explain the present invention and the scope of the present invention to those skilled in the art.

In the present invention, the term "very low temperature" refers to a temperature lower than −20° C., which is a typical freezing storage temperature of a freezer compartment, and a range thereof is not numerically limited thereto. Also, even in the very low temperature freezer compartment, a storage temperature thereof includes −20° C. and may be higher than −20° C.

[Overall Structure of Refrigerator Having Very Low Temperature Freezer Compartment]

FIG. 1 is a perspective view illustrating a refrigerator according to the present invention in a state in which doors thereof are opened, and FIGS. 2A to 2C are perspective views illustrating a state in which a grill fan assembly and a very low temperature freezer compartment are installed in an inner case of a freezer compartment of a refrigerator main body of the present invention, a partition wall, and a side wall of the inner case, respectively.

The refrigerator according to the present invention includes a refrigerator main body 10 having a rectangular parallelepiped shape and a refrigerator door 20 opening and closing each of spaces of a cabinet in front of the main body. The refrigerator of the present invention has a bottom freezer structure in which a refrigerator compartment 30 is provided at an upper portion thereof and a freezer compartment 40 is provided at a lower portion thereof, and the refrigerator compartment and the freezer compartment have side-by-side type doors 21 and 22, respectively, which are rotated and opened relative to hinges 25 at both ends of the refrigerator compartment 30 and the freezer compartment 40. However, the present invention is not limited to the refrigerator having the bottom freezer structure, and any refrigerator having a structure in which a very low temperature freezer compartment is installed in a freezer compartment may also be applied as a refrigerator having a side-by-side structure in which a refrigerator compartment and a freezer compartment are disposed on left and right sides, respectively, a refrigerator having a top mount structure in which a freezer compartment is disposed above a refrigerator compartment, and the like.

The refrigerator main body 10 includes an outer case 11 which forms an exterior of the refrigerator and an inner case 12 which is spaced a predetermined distance from the outer case 11 and constitutes an interior of each of the refrigerator compartment 30 and the freezer compartment 40. A heat insulating material 80 is foamed in a space between the outer case 11 and the inner case 12, which is filled with the heat insulating material 80, so that the refrigerator compartment 30 and the freezer compartment 40 are heat-insulated from an indoor space.

A shelf 13 and a drawer 14 are installed in storage spaces of the refrigerator compartment 30 and the freezer compartment 40 to increase space-using efficiency and store food, and may be guided along rails 15 disposed on left and right sides of the storage spaces and installed therein. As illustrated in the drawings, door baskets 27 are installed inside the refrigerator compartment door 21 and the freezer compartment door 22 are suitable for storing containers of drinks and the like.

A very low temperature freezer compartment 200 according to the present invention is provided in the freezer compartment 40. A space of the freezer compartment 40 is partitioned by a partition wall 42 extending vertically at a center of the freezer compartment to be divided into left and right sides for efficient use of space. Referring to FIGS. 2A to 2C, the partition wall 42 is installed to be fitted in an inward direction from a front side of the cabinet, and may be supported in the freezer compartment by a mounting guide 42-1 provided at a bottom of the refrigerator. According to the present invention, the very low temperature freezer compartment 200 is illustrated as being located on an upper right side of the freezer compartment 40. However, the present invention is not necessarily limited to the very low temperature freezer compartment 200 being provided in the freezer compartment. That is, the very low temperature freezer compartment 200 of the present invention may be provided in the refrigerator compartment 30. However, since a temperature difference between an inside and outside (a freezer compartment atmosphere) of the very low temperature freezer compartment when the very low temperature freezer compartment 200 is installed in the freezer compartment 40 is smaller when being installed in the refrigerator compartment 30, it is more advantageous for the very low temperature freezer compartment 200 to be installed in the freezer compartment from the viewpoint of cool air leakage prevention and heat insulation.

A machine compartment isolated from the freezer compartment is located at a lower rear portion of the freezer compartment, and a compressor 71 and a condenser 73 of a refrigeration cycle cooling system 70 using a refrigerant are disposed in the machine compartment. A grill fan assembly 50, which includes a grill fan 51 configured to define a rear wall of the freezer compartment and a shroud 56 which is coupled to a rear of the grill fan 51 to distribute cool air in the freezer compartment, is installed in a space formed between the freezer compartment and a rear wall of the inner case 12. An evaporator 77 of the refrigeration cycle cooling system 70 is installed in a space with a predetermined size between the grill fan assembly 50 and the rear wall of the inner case 12. The refrigerant evaporated when a refrigerant inside the evaporator 77 is evaporated exchanges heat with air flowing in an inner space of the freezer compartment, and the air cooled by the heat exchange is distributed in a cool air distribution space defined by the grill fan 51 and the shroud 56 and flows into the freezer compartment to cool the freezer compartment.

[Cooling Structure of Very Low Temperature Freezer Compartment and Freezer Compartment Including Very Low Temperature Freezer Compartment]

Figure 7:
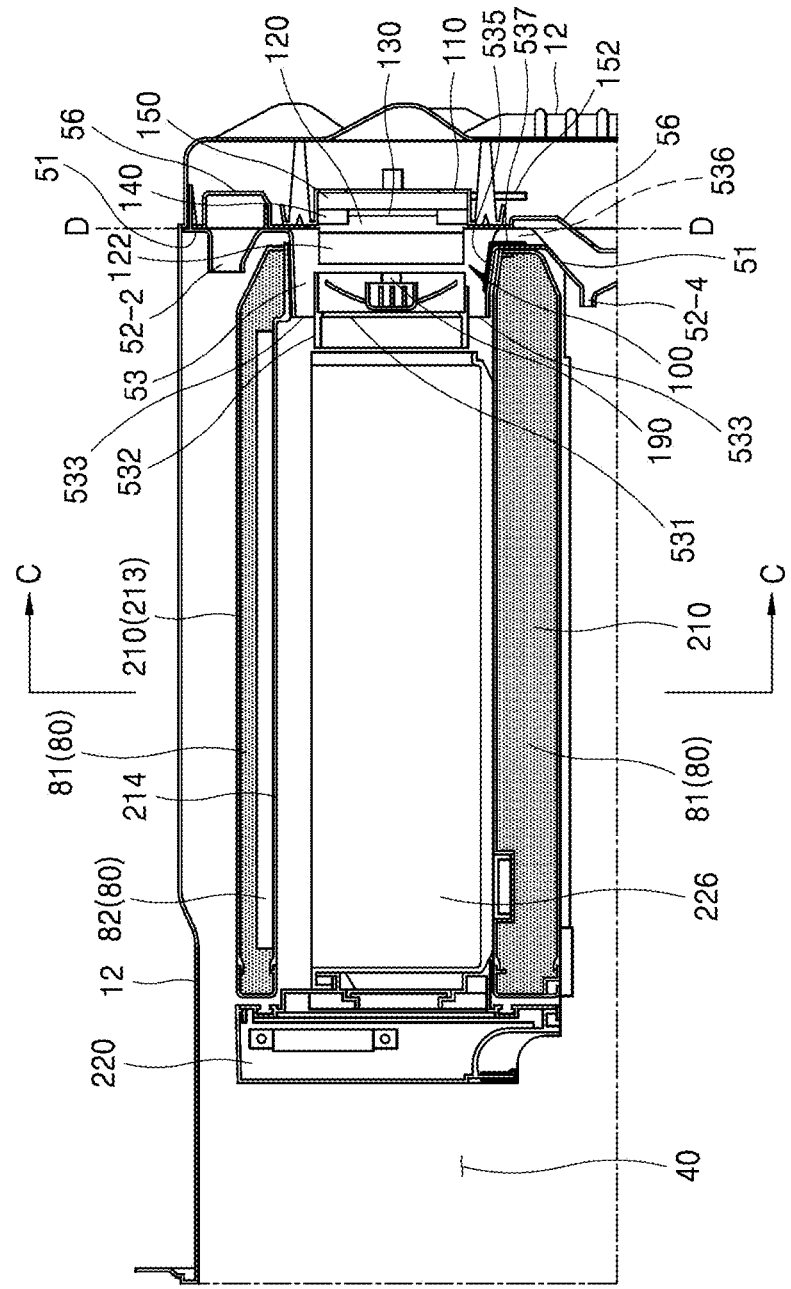
FIG. 7 is a cross-sectional view taken along line A-A of FIG. 2A.
Figure 8:
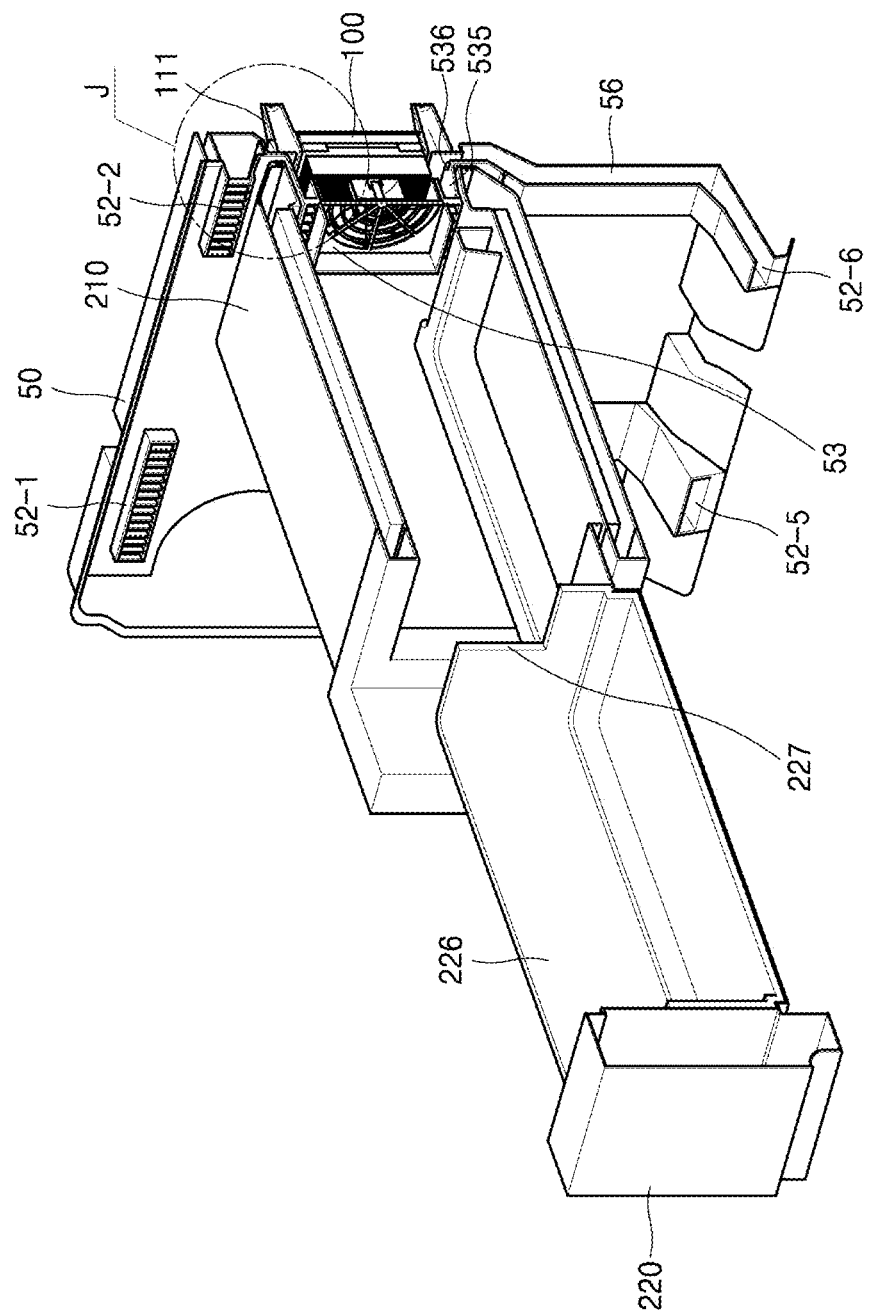
FIG. 8 is a cross-sectional view (from which a heating wire is omitted) taken along line B-B' of FIG. 3.
Figure 9:
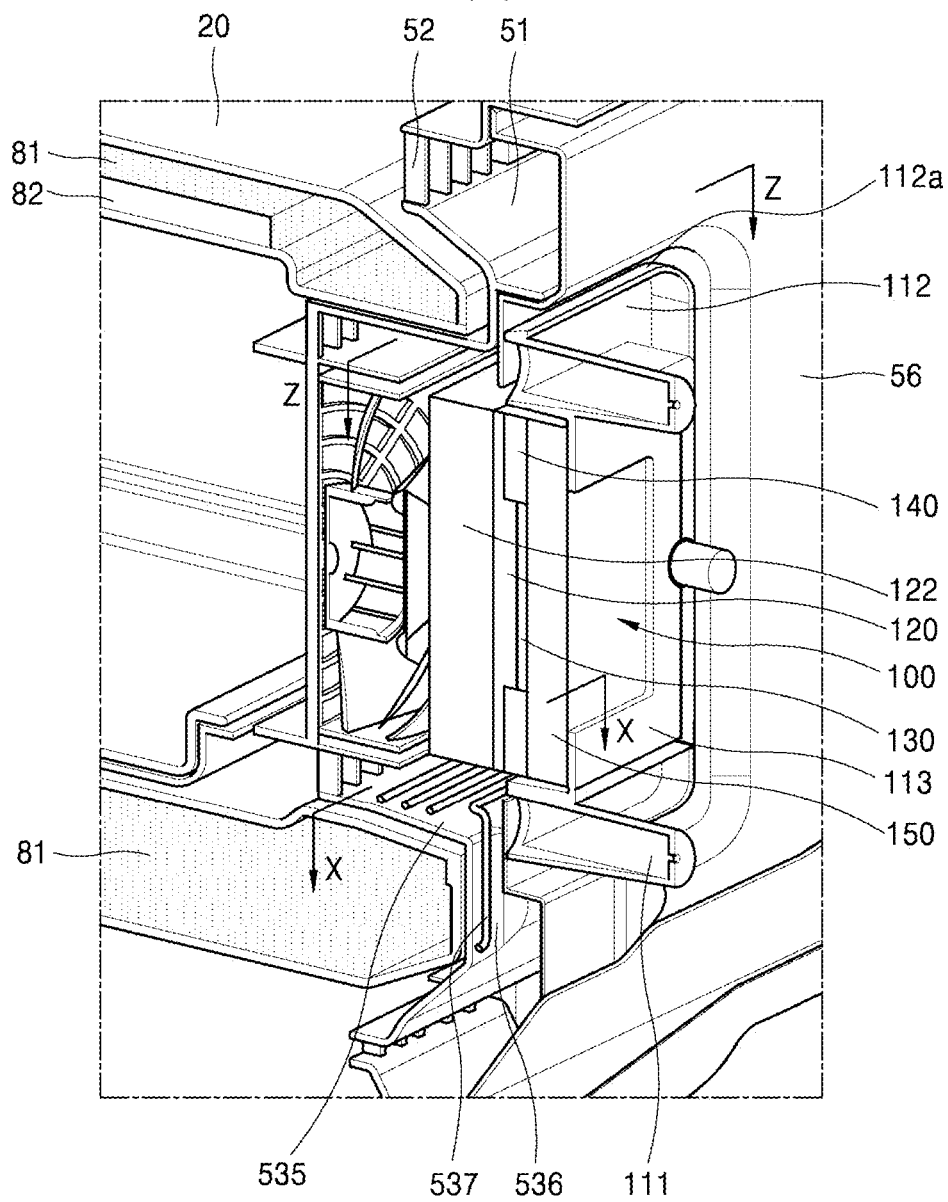
FIG. 9 is a perspective view of a side section of the grill fan assembly in which the TEM assembly is installed when viewed from the rear.
Figure 10:
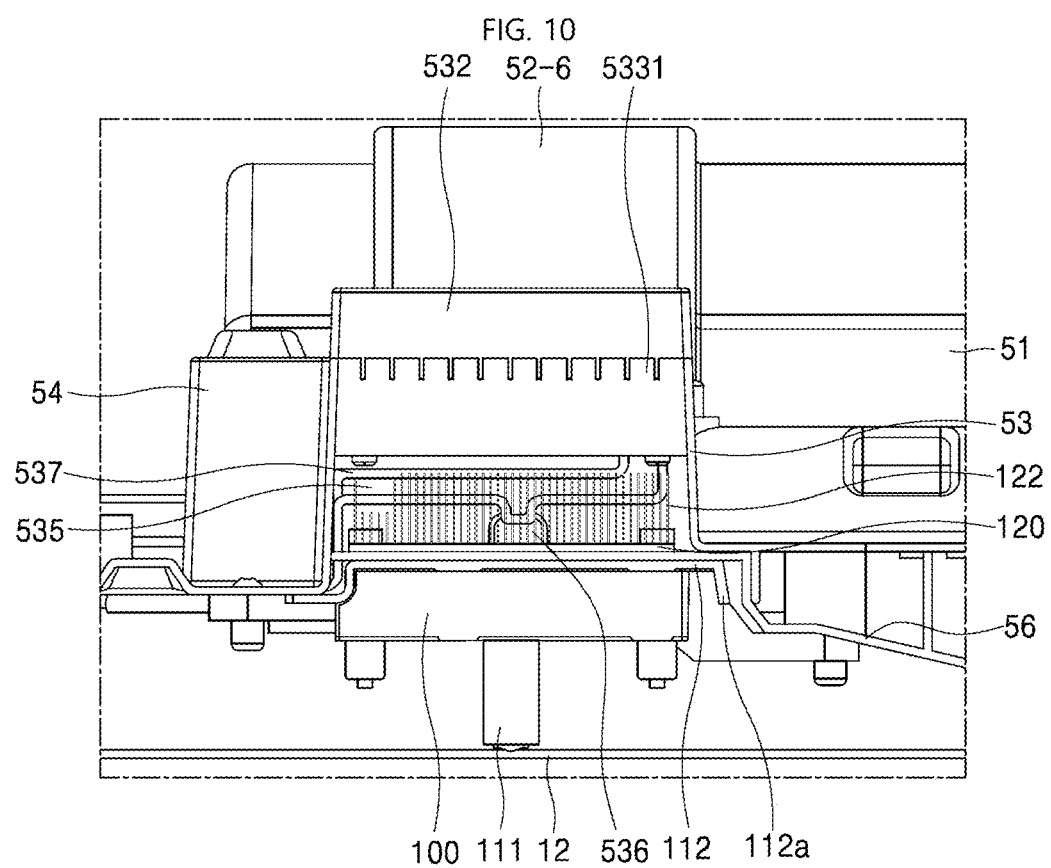
FIG. 10 is a cross-sectional view taken along line Z-Z of FIG. 9.
Figure 11:
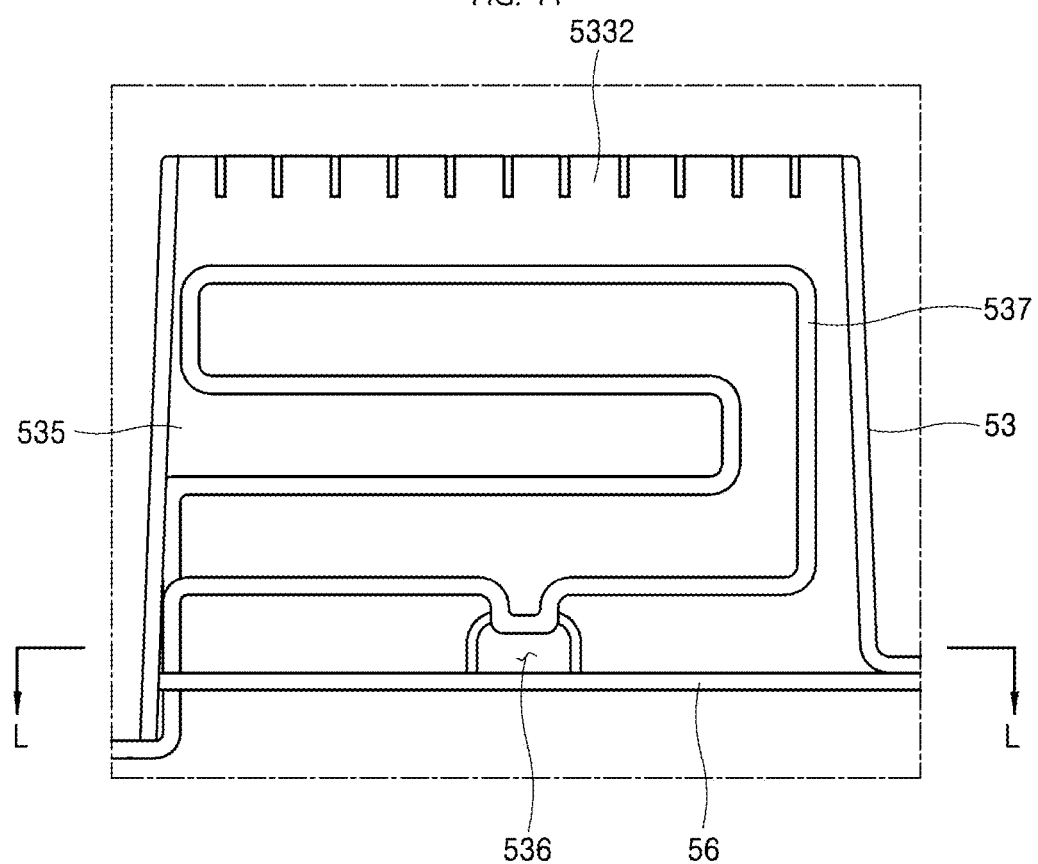
FIG. 11 is a cross-sectional view taken along line X-X of FIG. 9.
Figure 12:
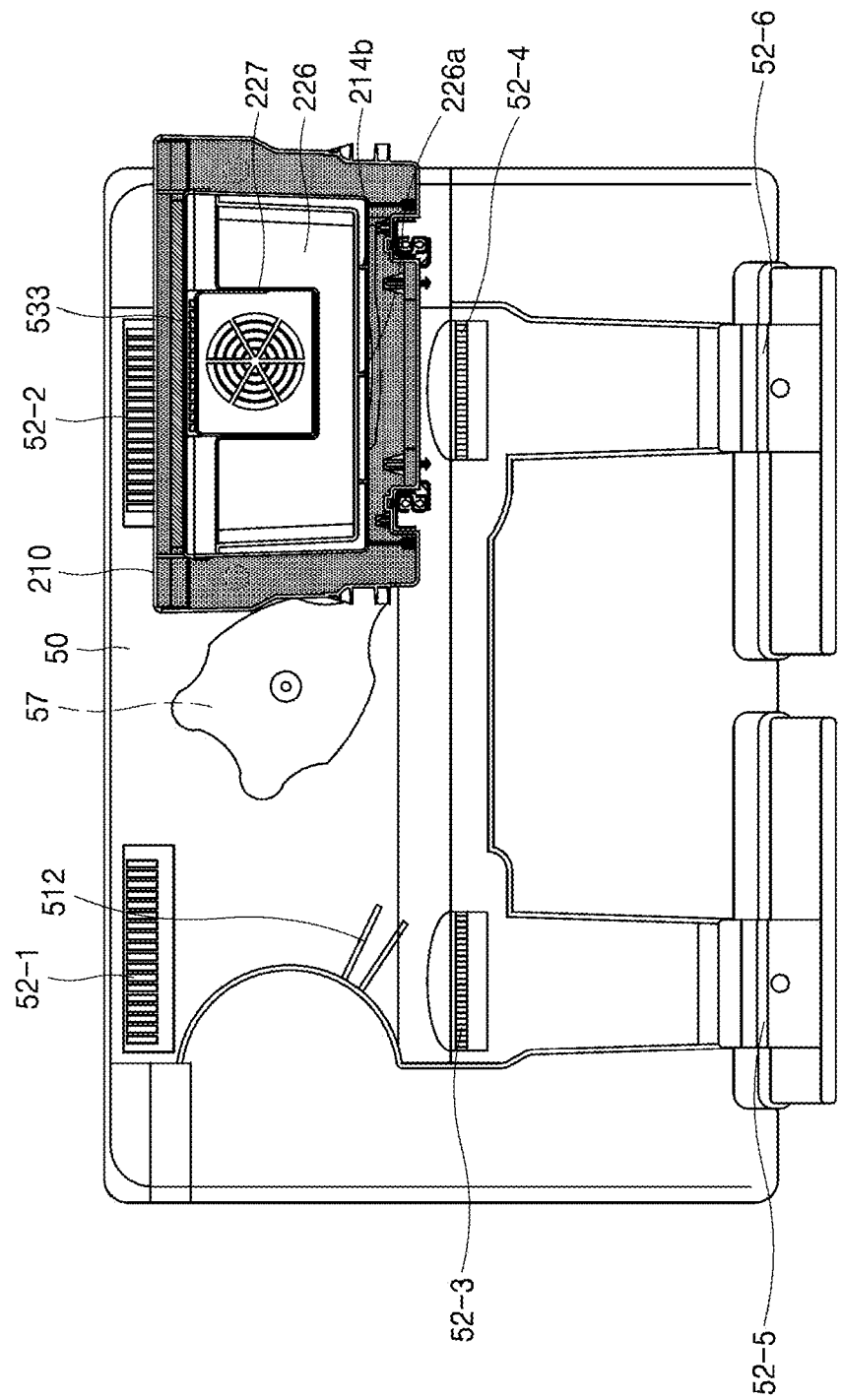
FIG. 12 is a cross-sectional view taken along line C-C of FIG. 7.

FIG. 3 is a front perspective view illustrating a state in which the grill fan assembly, the very low temperature freezer compartment, and a TEM assembly of the freezer compartment according to the present invention are disassembled, FIG. 4 is a perspective view illustrating a shroud of the grill fan assembly, FIG. 5 is an enlarged perspective view of a TEM accommodating part, FIG. 6 is a rear perspective view of FIG. 3, FIG. 7 is a cross-sectional view taken along line A-A of FIG. 2A, FIG. 8 is a cross-sectional view taken along line B-B' of FIG. 3, FIG. 9 is a perspective view of a side section of the grill fan assembly in which the TEM assembly is installed when viewed from the rear, FIG. 10 is a cross-sectional view taken along line Z-Z of FIG. 9, FIG. 11 is a cross-sectional view taken along line X-X of FIG. 9, and FIG. 12 is a cross-sectional view taken along line C-C of FIG. 7.

First, referring to FIGS. 3, 4, and 6, as an embodiment according to the present invention, the grill fan assembly 50 to which the very low temperature freezer compartment 200 is applied includes the grill fan 51 configured to define the rear wall of the freezer compartment and the shroud 56 configured to distribute cool air cooled by exchanging heat with the above-described evaporator 77 on a rear surface of the grill fan 51 and supply the cool air to the freezer compartment.

Cool air outlet pipes 52 which serve as paths for discharging cool air in a forward direction are provided as illustrated in the grill fan 51. In the illustrated embodiment, the cool air outlet pipes 52 are provided at upper left and right sides 52-1 and 52-2, central left and right sides 52-3 and 52-4, and lower left and right sides 52-5 and 52-6 (in FIG. 3, the cool air outlet pipes at the central left side and the lower left side are covered by the very low temperature freezer compartment).

The shroud 56 is coupled to the rear of the grill fan 51 and defines a space with a predetermined size with the rear surface of the grill fan 51 after being coupled thereto. The space serves as a space for distributing the air cooled by the evaporator 77 provided on the rear surface of the shroud 56 or the grill fan assembly 50. A cool air intake hole 58 configured to be in conjunction a space behind the shroud 56 with the space between the grill fan 51 and the shroud 56 is provided at a substantially central upper portion of the shroud 56. Further, a fan 57 configured to suction cool air in the space behind the shroud 56 through the cool air intake hole 58 and pressurize and distribute the cool air in the space between the grill fan 51 and the shroud 56 is installed inside the cool air intake hole 58 in the space between the grill fan 51 and the shroud 56.

The cool air pressurized by the fan 57 flows into the space between the grill fan 51 and the shroud 56, is appropriately distributed, and is discharged in the forward direction through the cool air outlet pipes 52, which are open in a forward direction of the grill fan 51. Referring to FIG. 4, a fan (see FIG. 6) provided in front of the cool air intake hole 58 is, for example, a sirocco fan that rotates in a counter-clockwise direction, sucks cold air in the freezer compartment through the cool air intake hole 58, and then discharges the cold air in a radial direction. The cool air is guided by guide partitions 591, 592, 593, and 594 which reduce a flow loss of the cool air and guide a flowing direction of the air so that the air is distributed and flows into the cool air outlet pipes 52 located at both of the upper sides 52-1 and 52-2, both of the central sides 52-3 and 52-4, and both of the lower sides 52-5 and 52-6 of the grill fan. A protrusion provided above the cool air outlet pipe 52-3 of the grill fan 51 in FIG. 12 is a waterway groove 512 protruding in the forward direction in a slim form, and has a structure in which dew condensation that can be formed on an inner wall of the grill fan 51 is prevented from flowing through the cool air outlet pipes 52-3 and 52-5 while flowing downward. That is, the waterway groove 512 of the grill fan 51 has a concave groove shape on a back surface of the grill fan and has a shape inclined downward from a left to a center so that water droplets flowing downward from above may fall down. As a result, the water droplets do not move into the cold air outlet pipe.

Air discharged into the freezer compartment 40 through the cool air outlet pipes 52 spreads uniformly inside the freezer compartment and flows to the door basket 27 of the freezer compartment door 22. Therefore, the air cooled by the evaporator 77 is uniformly supplied into the freezer compartment to cool the freezer compartment.

Meanwhile, referring to FIGS. 3 and 5 to 12, A TEM accommodating part 53 in which a TEM assembly 100 configured to freeze the very low temperature freezer compartment 200 at a very low temperature is provided between the upper right side cool air outlet pipe 52-2 and the central right side cool air outlet pipe 52-4 at an upper right portion of the grill fan 51.

Figure 21:
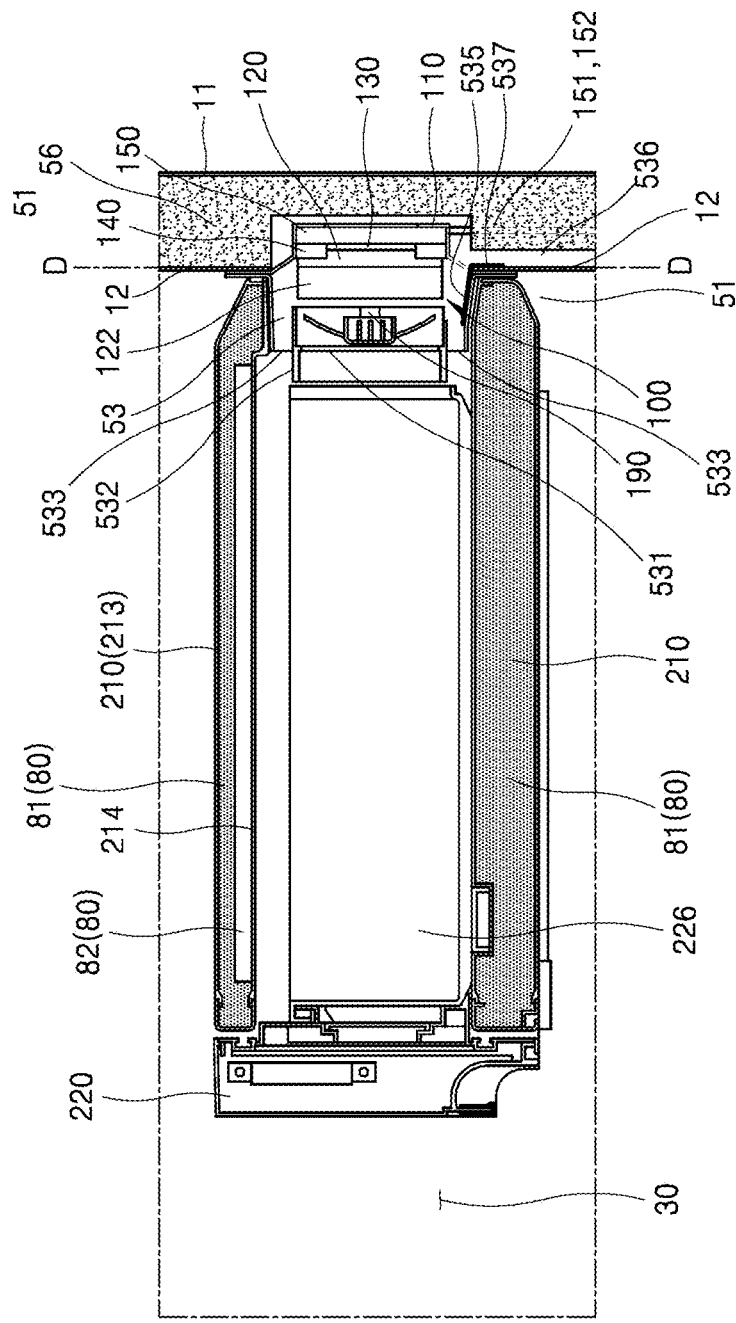
FIG. 21 is a side cross-sectional view illustrating an example in which the very low temperature freezer compartment of the present invention is installed in a refrigerator compartment.

First, referring to FIGS. 3 and 5, the TEM accommodating part 53 is provided on a front surface of the grill fan 51 to correspond to a position of the freezer compartment 40 at which the very low temperature freezer compartment 200 is installed. The TEM accommodating part 53 may be integrally molded with a wall defining a rear boundary of the freezer compartment 40, which is one of storage spaces in which cooling is performed by the refrigeration cycle cooling system 70, that is, with the grill fan 51, or may be installed via a manner in which the TEM accommodating part 53 is manufactured and assembled as a separate part from the wall. For example, the grill fan may be manufactured by injection molding. In this case, a method of molding a portion corresponding to the TEM accommodating part 53 may be applied with the injection molding. On the other hand, when a rear boundary of the storage space is defined by the inner case 12 and it is difficult to mold a shape of the TEM accommodating part 53 in the process of molding the inner case 12, a method of manufacturing the TEM accommodating part 53 as a separate part and assembling and fixing the TEM accommodating part 53 to the wall, as illustrated in FIG. 21, may be applied.

The TEM accommodating part 53 has a substantially rectangular parallelepiped shape protruding and extending forward from the front surface of the grill fan 51 (the rear of the TEM accommodating part 53 is open toward the freezer compartment in which the evaporator is provided), and a shape thereof when viewed from the front is a substantially rectangular shape that is longer vertically than it is horizontally. A grill portion 531 for discharging air cooled by the TEM assembly 100 is provided at a central portion of the rectangular shape when viewed from the front, and suction portions 533 are provided in upper and lower portions thereof. The suction portions 533 serve as paths for suctioning air outside the suction portions 533 into an inner space (that is, an inner space of a rectangular outer peripheral wall defining an outer shape of the TEM accommodating part 53 and a space located behind the grill portion 531) of the TEM accommodating part 53. The inner space of the TEM accommodating part 53 is a space isolated from the space provided in front of the grill fan 51 except that the inner space of the TEM accommodating part 53 is in conjunction with the space provided in front of the TEM accommodating part 53 through the grill portion 531 and the suction portion 533.

In order to prevent the cool air discharged from the grill portion 531 from being immediately re-introduced into the suction portion 533 disposed close to the grill portion 531, a discharge guide 532 having a shape of a partition extending forward between the grill portion 531 and the suction portion 533 is provided between the grill portion 531 and the suction portion 533. Providing the discharge guide 532 only in a range in which the grill portion 531 and the suction portion 533 are adjacent to each other is sufficient to prevent the air discharged from the grill portion 531 from being immediately re-introduced into the suction portion 533.

However, when it is desired to further improve an effect a property in which the cool air discharged from the grill portion 531 is flows forward, that is, straightness, the discharge guide 532 preferably has a shape which entirely surrounds the grill portion 531, as illustrated. A flow cross section of the discharge guide 532 may be a square shape as illustrated, but may have a circular shape like the grill portion 531 or a blade shape of the fan disposed behind the grill portion. The flow cross section shape does not necessarily have a rectangular or circular flow cross section as long as it can improve straightness of the cool air while preventing the cool air discharged from the grill portion from being re-introduced into the suction portion, and may be modified in various forms.

The suction portions 533 are not necessarily limited to being located at the upper and lower positions of the cooling fan 190. That is, the suction portions may be provided on left and right sides of the cooling fan 190, and the suction portions may be provided at one or more selected positions of upper, lower, left, and right sides of the cooling fan.

As illustrated in FIGS. 6 to 9, the rear of the TEM accommodating part 53 is open. The TEM assembly 100 is inserted in a forward direction into the TEM accommodating part 53 from behind the grill fan 51 and is accommodated therein.

A sensor mounting part 54 in which a sensor configured to sense a temperature and humidity of the very low temperature freezer compartment 200 is installed is continuously provided at one side of the TEM accommodating part 53 (see FIGS. 3, 5, and 10). A defrosting sensor is provided in the sensor mounting part 54 to determine whether defrosting is required by sensing a defrosting time of a cold sink 120, which will be described below. Preferably, the sensor mounting part is provided at a position at which a state of the very low temperature freezing space is expressed when the state of the very low temperature freezing space is measured. Since the suction portions according to the embodiment of the present invention are disposed at the upper and lower portions of the TEM accommodating part, the sensor mounting part being installed to avoid these positions is advantageous for a more accurate measurement. Therefore, in the present invention, the sensor mounting part 54 is designed to be installed on a side surface of the TEM accommodating part 53. Further, a through hole is provided in the sensor mounting part 54 in the forward direction so that an air atmosphere in front of the sensor mounting part may be transmitted to an inner space of the sensor mounting part 54 through the through hole.

Referring to FIGS. 7 to 11, a small space is present in the lower portion of the TEM accommodating part 53 when the TEM assembly 100 is accommodated therein. The space is the inner space of the TEM accommodating part, which is provided behind a suction portion 5332 provided in front of the space, and is a flow path of air introduced into the inner space of the accommodating part through the suction portion 5332. That is, the air introduced through the suction portion 5332 passes through the small space provided in the lower portion of the TEM accommodating part 53, moves upward, and exchanges heat with the cold sink 120.

Referring to FIGS. 9 to 11, a drain slope 535 having a shape inclined downward from the suction portion 5332 to a main body of the grill fan 51 is provided at a bottom surface of the TEM accommodating part 53 behind the suction portion 5332. The drain slope 535 represents the bottom surface of the TEM accommodating part 53 that is inclined downward. A drain hole 536 is provided at a center of a lower end of the drain slope 535. The cold sink 120 is disposed directly above the drain slope 535.

According to the structure, as defrosting is performed on condensed liquid water of the cold sink 120, water falling from the cold sink 120 falls onto the drain slope 535, and the water falling onto the drain slope 535 flows downward along the downward inclined surface and moves to the drain hole 536. Finally, the water is drained downward along the drain hole 536.

The drain slope 535 and the drain hole 536 are provided in a space which is in conjunction with the very low temperature freezing space. Therefore, the water which falls from the cold sink 120 and a heat exchange pin 122 of the cold sink 120 onto the drain slope due to defrosting may be refrozen on the drain slope in a very low temperature atmosphere and in the drain hole 536.

In consideration of this fact, a heating wire 537 is installed on the bottom surface and the drain hole to prevent the defrosted water from being refrozen. When the defrosting of the cold sink 120 disposed in the TEM accommodating part 53 is performed by a defrost sensor of the sensor mounting part, the water which falls from the cold sink 120 onto the drain slope 535 may flow along the inclined surface of the drain slope 535 toward the drain hole 536 and may be guided to the drain hole 536 without being frozen by heat generated by the heating wire 537. Further, since the heating wire extends to an inside of the drain hole 536, the defrosted water which flows downward along the drain hole 536 is also not frozen and flows downward. The defrosted water which flows from the drain hole 536 is collected into a drain tray for the evaporator 77 in the freezer compartment, which is located behind the shroud, through a hole in the shroud located under the drain hole. Such a phenomenon in which water may not be drained in the very low temperature and is refrozen in the drain slope and the drain hole may be prevented by the heat of the heating wire 537.

Hereinafter, a method of installing the very low temperature freezer compartment 200 will be described. Guide rails 212 extending in forward and backward directions are provided on both ends of the very low temperature case 210 of the very low temperature freezer compartment 200, as illustrated in FIGS. 3 and 6. Specifically, each of the guide rails 212 has a shape in which an upper guide part 212-1 and a lower guide part 212-2, which are a pair of vertically spaced protrusions, are elongated in the forward and backward directions and protrude laterally. Accordingly, grooves having a shape recessed in the forward and backward directions are provided between the pair of protrusions. That is, the guide rails 212 protrude to have a cross section similar to a bracket shape.

Meanwhile, as illustrated in FIGS. 2A to 2C, the rails 15 having a shape corresponding to the recessed space of the guide rail 212 and extending in the forward and backward directions and protruding laterally are provided on side surfaces of the inner case 12 of the freezer compartment 40 and side surfaces of the partition wall 42. The rails are manufactured separately from the inner case 12 by injection molding to secure shape accuracy and strength and may then be installed to be coupled to an inner surface of the inner case 12. The rails may be used as pedestal structures when shelves or drawers are installed. According to the present invention, the very low temperature freezer compartment may be installed using the rails. The rails 15 may be attached to an inner wall of a side surface of the freezer compartment and a side surface of the partition wall. Each of the rails 15 has a shape in which an upper rail 15-1 and a lower rail 15-2, which are a pair of vertically spaced protrusions, are elongated in the forward and backward directions and protrude laterally, and protrudes to have a cross section similar to a bracket shape. Rear ends of the upper rail 15-1 and the lower rail 15-2 are connected to each other to regulate insertion depths of the guide rails 212 of the very low temperature case. The guide rails 212 and the rails 15 may be fastened to each other so that the lower guide part 212-2 is mounted on the lower rail 15-2 and the upper guide part 212-1 is mounted on the upper rail 15-1. According to the structure, since the guide rails 212 are vertically supported by the rails 15 in two stages, the guide rails 212 and the rails 15 may be more firmly fixed.

In this manner, when groove spaces of the guide rails 212 provided at both of the ends of the very low temperature case 210 are inserted into the rails 15 provided on the side surfaces of the inner case 12 of the freezer compartment and the side surfaces of the partition wall 42 and the very low temperature case 210 is pushed rearward and fixed, an inner space of the very low temperature freezer compartment 200 faces the TEM accommodating part 53 and the sensor mounting part 54, as illustrated in FIGS. 7 to 12. An opening 211 through which the TEM accommodating part 53 and the sensor mounting part 54 are inserted is provided in a rear of the very low temperature case 210 of the very low temperature freezer compartment 200. An inner circumferential surface of the opening 211 is fitted to outer circumferential surfaces of the TEM accommodating part 53 and the sensor mounting part 54.

In order to facilitate the fitting of these circumferential surfaces, an inner circumferential surface 534 of the TEM accommodating part 53, the outer circumferential surface of the sensor mounting part 54, and the inner circumferential surface of the opening 211 of the very low temperature case 210 may be manufactured to have a shape having a slightly inclined surface that gradually narrows toward a front thereof and gradually widens toward a rear thereof (see FIGS. 7 to 9). Since a cross-sectional area of a rear end of the opening of the very low temperature case is slightly greater than a cross-sectional area of a front end of each of the TEM accommodating part 53 and the sensor mounting part 54 when the circumferential surfaces have such an inclined surface shape, the TEM accommodating part 53 and the sensor mounting part 54 are naturally guided into the opening of the very low temperature case 210 and the insertion begins at an initial stage of insertion, and the cross-sectional area of each of the TEM accommodating part 53 and the sensor mounting part 54 coincides with the cross-sectional area of the opening 211 of the very low temperature case, and these parts are firmly fitted when the insertion is completed.

The TEM assembly 100 is inserted in the forward direction into the TEM accommodating part 53 from behind the grill fan assembly 50 and is accommodated and fixed therein. More particularly, referring to FIGS. 6 to 10, first, on a front side of the TEM accommodating part 53, an outer circumferential surface of the cooling fan 190 in the form of a box fan is fixed to a front surface of the TEM accommodating part 53 by a fastening means such as a screw in a state in which the outer circumferential surface of the cooling fan 190 faces an inner circumferential surface of the TEM accommodating part 53 and a position thereof is regulated. The TEM assembly 100 is inserted in the forward direction from the rear of the grill fan assembly 50 to be disposed behind the cooling fan 190, and is fastened and fixed to the grill fan assembly 50 by the fastening means such as a screw.

Only the grill fan 51 may be present or the grill fan 51 and the shroud 56 may be present in an overlapping form at a portion of the grill fan assembly 50 at which the TEM assembly 100 is fixed. Alternatively, only the grill fan may be partially present and the grill fan and the shroud may be present in the overlapping form at the remaining portion thereof at a portion of the portion of the grill fan assembly 50 at which the TEM assembly 100 is fixed. When the TEM assembly 100 is fixed to a portion at which the grill fan and the shroud overlap by a fixing means such as a screw or the like, the TEM assembly 100 may be fixed at the same time in a case in which the grill fan and the shroud are fixed to each other so that convenience of assembly may be obtained, and the TEM assembly 100 may be fixed to a firmer point by the grill fan and the shroud being stacked.

A spacer 111 extends rearward in the TEM assembly 100, and an end of the spacer 111 is in contact with the inner case 12. That is, the spacer 111 is supported by the inner case 12 and functions to support the TEM assembly 100 to be maintained at a position spaced forward from the inner case 12. Since the end of the spacer 111 is fixed to the inner case 12 as described above, the TEM assembly 100 is maintained at a position that is clearly spaced from the inner case 12, and thus heat radiation efficiency of a heat generating portion of the TEM assembly 100 is further improved.

Meanwhile, as will be described below, a flow path through which the refrigerant passes is provided in the heat sink 150 of the TEM assembly 100, and an inlet pipe 151 and an outlet pipe 152 for introduction and discharge of the refrigerant are provided in the heat sink. Each of the inlet pipe and the outlet pipe of the refrigerant, which are provided in the heat sink 150 of the TEM assembly in an assembling process of a refrigerator, should be welded to a refrigerant pipe through which the refrigerant flows in the refrigeration cycle cooling system 70 of the refrigerator. Specifically, the inlet pipe 151 may be connected to a rear end of the condenser, that is, a rear of an expansion device such as a capillary tube or the like, and the outlet pipe 152 may be connected to a front of the evaporator.

In the TEM assembly 100, since the components illustrated in FIG. 13, which will be described below, are secured and fixed in the form of an assembled module with a predetermined distance from the inner case 12 by the spacer 111, a worker may more easily perform a welding task of the refrigerant pipe in the space secured by the spacer 111, the grill fan assembly 50 may be installed in a back portion of the freezer compartment after the welding task of the refrigerant pipe, and the grill fan assembly and the TEM assembly 100 may be fixed. The spacer 111 may be fixed to the inner case 12 by a screw or the like or may be fixed to the inner case 12 via a method in which a hole provided in the rear of the spacer 111 is fitted to the protrusion protruding from the inner case 12.

The very low temperature case 210 has a housing structure having an opening at the front and the opening 211 formed at a portion of the rear thereof and having a substantially rectangular parallelepiped shape, and the guide rails 212 extending in the forward and backward directions are provided on left and right side surfaces of the very low temperature case 210 as described above. The very low temperature case 210 includes an outer case 213 facing the space of the freezer compartment and an inner case 214, which is coupled to the outer case 213, inside the outer case 213 and defining a size with a predetermined size with the outer case 213. The heat insulating material 80 is provided in the space between the outer case 213 and the inner case 214 to insulate heat in a gap between a space inside the very low temperature freezer compartment 200 and the space of the freezer compartment 40. A foam heat insulating material 81 such as polyurethane or the like may be used as the heat insulating material, and the foam heat insulating material functions to fix the outer case and the inner case in addition to a function of heat insulation. The space between the outer case 213 and the inner case 214 may be filled with the heat insulating material through a foam inlet 218 (see FIG. 6) provided in the rear of the very low temperature case 210. After injection, the foam inlet 218 may be closed with a lid (not illustrated) or the like. A vacuum insulated panel 82 having better insulation efficiency may be further applied to a wall of the very low temperature case which should have a thin thickness.

The open front of the very low temperature case 210 is opened and closed by the very low temperature compartment door 220. The very low temperature compartment door 220 has a space with a predetermined size thereinside, and the heat insulating material is provided in the space to insulate heat in a gap between the space inside the very low temperature freezer compartment 200 and the space of the freezer compartment 40. The very low temperature compartment door 220 may preferably have a certain level of thickness for a grip feeling of a user, and the foam heat insulating material may be foamed in an inside of a hollow to secure rigidity.

A very low temperature tray 226 accommodated in an inner space of the very low temperature case 210 is fixedly installed at the rear of the very low temperature compartment door 220. The very low temperature tray 226 may be configured to move integrally with the very low temperature compartment door 220. When the very low temperature compartment door 220 is withdrawn in the forward direction, the very low temperature tray 226 may be slid and withdrawn in the forward direction from the very low temperature case 210. The very low temperature compartment door 220 may be guided by an outer rail provided on a lower or bottom surface of the very low temperature case 210, and may be slid forward and backward.

An open groove 227 having a shape which is open to allow cool air to flow into the very low temperature tray 226 when the cool air cooled in the TEM assembly 100 is introduced into the open groove 227 in the forward direction by the cooling fan 190 is provided at a rear wall of the very low temperature tray 226. The shape of the open groove 227 corresponds to that of the TEM accommodating part 53, as illustrated in FIGS. 8 and 12. When the very low temperature freezer compartment 200 is installed in the freezer compartment 40, the open groove 227 faces the TEM accommodating part 53 so that low temperature cool air supplied forward from the TEM accommodating part 53 by the cooling fan 190 may be smoothly introduced into an inner space of the very low temperature tray 226.

Meanwhile, referring to FIG. 7, an upper surface of the very low temperature case 210 is slightly spaced apart from a bottom surface of an upper member of the inner case 12, that is, a sealing surface. According to the present invention, the upper surface of the very low temperature case 210 and the bottom surface of the upper member of the inner case 12 cooperate with each other to implement a structure like a duct, and accordingly, air discharged from the cool air outlet pipe 52-2 at an upper end of the grill fan 51 is guided forward along a structure such as the above-described duct and flows smoothly. Therefore, even when the very low temperature case 210 is installed, cool air may also smoothly reach the door basket 27 provided in an upper portion of an inside of the freezer compartment door 22.

A thickness of an upper wall of the very low temperature case 210 should be made thin to implement a structure like the above-described duct. That is, the thickness of the upper wall of the very low temperature case 210 should be made thin so that an inner volume of the very low temperature case may be secured and a structure like the duct may be implemented. In this respect, in the present invention, the thickness of the upper member of the very low temperature case is made thin by foaming the foam heat insulating material 81 in the remaining space in a state in which the vacuum insulated panel 82 is embedded inside the upper member of the very low temperature case. The foam heat insulating material functions to fill the space inside between the outer case and the inner case which are not filled by the vacuum insulated panel, and functions to further improve a mounting force of the outer case and the inner case as well as heat insulation.

In addition, since the cool air outlet pipe 52-4 located near a center of a height of the grill fan 51 is disposed below the very low temperature case 210, the cool air discharged through the cool air outlet pipe 52-4 may also smoothly flow forward.

[Structure and Installation Structure of TEM Assembly]

Figure 13:
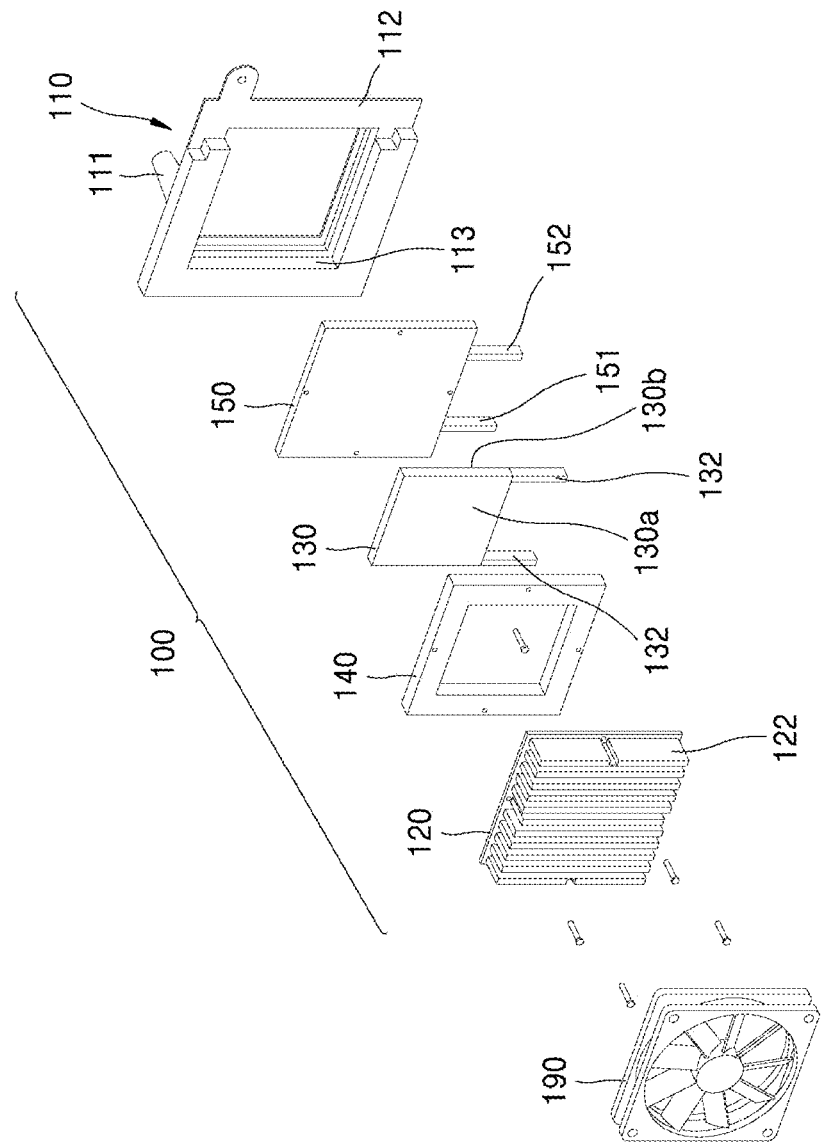
FIG. 13 is an exploded perspective view of the TEM assembly according to the present invention.

FIG. 13 is an exploded perspective view of the TEM assembly according to the present invention.

The TEM assembly 100 is an assembly in which the cold sink 120, the thermoelectric element 130, the heat insulating material 140, and the heat sink 150 are stacked and installed in a module housing 110 to form a module.

The thermoelectric element 130 is an element using a Peltier effect. The Peltier effect refers to a phenomenon in which, when a direct current (DC) voltage is applied to ends of two different elements, heat is absorbed on one side and is generated on the other side according to a direction of the current.

The thermoelectric element has a structure in which an N-type semiconductor material in which electrons are main carriers and a P-type semiconductor material in which holes are main carriers are alternately connected in series. An electrode portion for allowing a current to flow from the P-type semiconductor material to the N-type semiconductor material is disposed on a first surface relative to any one direction in which the current flows, and an electrode portion for allowing a current to flow from the N-type semiconductor material to the P-type semiconductor material is disposed on a second surface. Therefore, when the current is supplied in a first direction, the first surface is a heat-absorbing surface and the second surface is a heat-generating surface, and when the current is supplied in a second direction opposite the first direction, the first surface is the heat-generating surface and the second surface is the heat-absorbing surface.

According to the present invention, since the TEM assembly 100 is inserted in the forward direction from the rear of the grill fan assembly 50 and fixed and the very low temperature freezer compartment 200 is provided in front of the TEM assembly 100, heat may be absorbed at a surface forming the front of the thermoelectric element, that is, a surface facing the very low temperature freezer compartment 200, and heat may be generated at a surface forming the rear of the thermoelectric element, that is, a surface facing opposite the very low temperature freezer compartment 200 or a surface opposite in a direction in which the very low temperature freezer compartment 200 is viewed. When current is supplied in the thermoelectric element in the first direction such that heat is absorbed at the surface facing the very low temperature freezer compartment and heat is generated at the surface opposite thereto, the very low temperature freezer compartment may be cooled.

In the embodiment of the present invention, the thermoelectric element 130 has the same shape as a flat plate having a front surface and a rear surface, and, for example, the front surface is a heat-absorbing surface 130a and the rear surface is a heat-generating surface 130b. DC power supplied to the thermoelectric element 130 causes the Peltier effect, and thus heat of the heat-absorbing surface 130a of the thermoelectric element 130 moves toward the heat-generating surface 130b. Therefore, the front surface of the thermoelectric element 130 is a cold surface and a rear surface thereof is a heat-generating portion. That is, the Peltier effect causes heat inside the very low temperature freezer compartment 200 is discharged outside the very low temperature freezer compartment 200. Power supplied to the thermoelectric element 130 may be applied to the thermoelectric element through conducting wires 132 provided in the thermoelectric element 130.

The cold sink 120 is stacked on the front surface of the thermoelectric element 130, that is, on the heat-absorbing surface 130a facing the very low temperature freezer compartment 200 to be in contact therewith. The cold sink 120 may be made of a metal material such as aluminum having a high thermal conductivity or an alloy material, and a plurality of heat exchange pins 122 extending in a vertical direction are formed on a front surface of the cold sink 120 to be spaced apart from each other. The heat exchange pins 122 are preferably elongated vertically and continuously extended without breaking. This is to secure a property in which water melted in the cold sink during defrosting of the cold sink 120 flows smoothly along a continuous form of the heat exchange pins extending vertically in the direction of gravity. The heat exchange pins 122 preferably have enough of an interval to prevent a downward flow of water formed between two adjacent heat exchange pins 122 due to surface tension.

Air inside the very low temperature freezer compartment flows and performs a heat exchange in the cold sink 120 attached to the heat-absorbing surface of the thermoelectric element. A phenomenon in which moisture contained in air is frozen on a colder surface of the cold sink when food is cooled inside the very low temperature freezer compartment occurs. In order to remove such frozen water, power is applied in a current supplying direction, that is, in the above-described second direction opposite the first direction. The heat-absorbing surface and the heat-generating surface of the thermoelectric element 130 are changed relative to the case in which the power is applied in the first direction. Accordingly, a surface of the thermoelectric element in contact with the heat sink acts as the heat-absorbing surface and a surface of the thermoelectric element in contact with the cold sink acts as the heat-generating surface. Therefore, the frozen water which was frozen in the cold sink is melted and flows downward in the direction of gravity, and thus defrosting is performed. That is, according to the present invention, when condensation occurs in the cold sink 120 and defrosting is required, defrosting may be performed by applying a current in the second direction opposite the first direction, which is a direction of a current applied to cause a very low temperature cooling action.

The heat sink 150 is stacked to be in contact with the rear surface of the thermoelectric element 130, that is, on the heat-generating surface 130b which is opposite the direction in which the very low temperature freezer compartment 200 is disposed. The heat sink 150 is configured to rapidly dissipate or discharge heat generated on the heat-generating surface 130b by the Peltier effect, and a portion corresponding to the evaporator 77 of the refrigeration cycle cooling system 70 used for cooling the refrigerator may be configured as the heat sink 150. That is, when a process in which a low-temperature and low-pressure liquid refrigerant passing through the expansion device 75 in the refrigeration cycle absorbs heat or evaporates while absorbing heat is performed in the heat sink 150, the heat generated on the heat-generating surface 130b of the thermoelectric element 130 is absorbed by the refrigerant in the refrigeration cycle or is absorbed while the refrigerant is evaporated, and thus the heat of the heat-generating surface 130b may be immediately cooled.

Since the above-described cold sink 120 and the heat sink 150 are stacked by the thermoelectric element 130 having a flat shape being interposed therebetween, it is necessary to isolate heat therebetween. Therefore, the heat insulating material 140, which surrounds a periphery of the thermoelectric element 130 and fills a gap between the cold sink 120 and the heat sink 150, is stacked on the TEM assembly 100 of the present invention. That is, an area of the cold sink 120 is greater than that of the thermoelectric element 130, and is substantially the same as that of each of the thermoelectric element 130 and the heat insulating material 140. Similarly, an area of the heat sink 150 is greater than that of the thermoelectric element 130, and is substantially the same as that of each of the thermoelectric element 130 and the heat insulating material 140.

Meanwhile, sizes of the cold sink 120 and the heat sink 150 are not necessarily the same as each other, and the heat sink 150 may be configured to be larger to effectively discharge heat.

However, according to the present invention, the refrigerant of the refrigeration cycle cooling system 70 flows through the heat sink so that the heat of the heat sink 150 is instantly, reliably, and efficiently discharged, and the refrigerant is evaporated in the heat sink and rapidly absorbs the heat from the heat-generating surface of the thermoelectric element 130 as vaporization heat by allowing the flow path of the refrigerant to be disposed over the entire area of the heat sink. That is, the heat sink illustrated in the present invention is designed to have a size sufficient to immediately absorb and discharge heat generated by the thermoelectric element, and the cold sink may have a size smaller than the above size. However, in the present invention, it should be noted that heat exchange efficiency at the cold sink is further increased by the size of the cold sink being increased in consideration of a heat exchange between a gas and a solid being performed at the cold sink and a heat exchange between a liquid and a solid being performed at the heat sink. In the embodiment of the present invention, in order to increase the size of the cold sink, the cold sink is illustrated as being designed to have a size corresponding to that of the heat sink in consideration of compactness of the TEM assembly. However, the cold sink may be configured to be larger than the heat sink to further increase heat exchange efficiency of the cold sink.

The cold sink 120, the thermoelectric element 130, the heat insulating material 140, and the heat sink 150 are inserted and fixed into an accommodating groove 113 of the module housing 110 in a state in which they are closely stacked by a tightening means such as a screw. A flange 112 having an outwardly extending shape is provided at an edge of a front end of the accommodating groove 113 of the module housing 110. The flange 112 is a portion in which the TEM assembly 100 is closely fixed to the grill fan assembly 50.

Figure 16B:
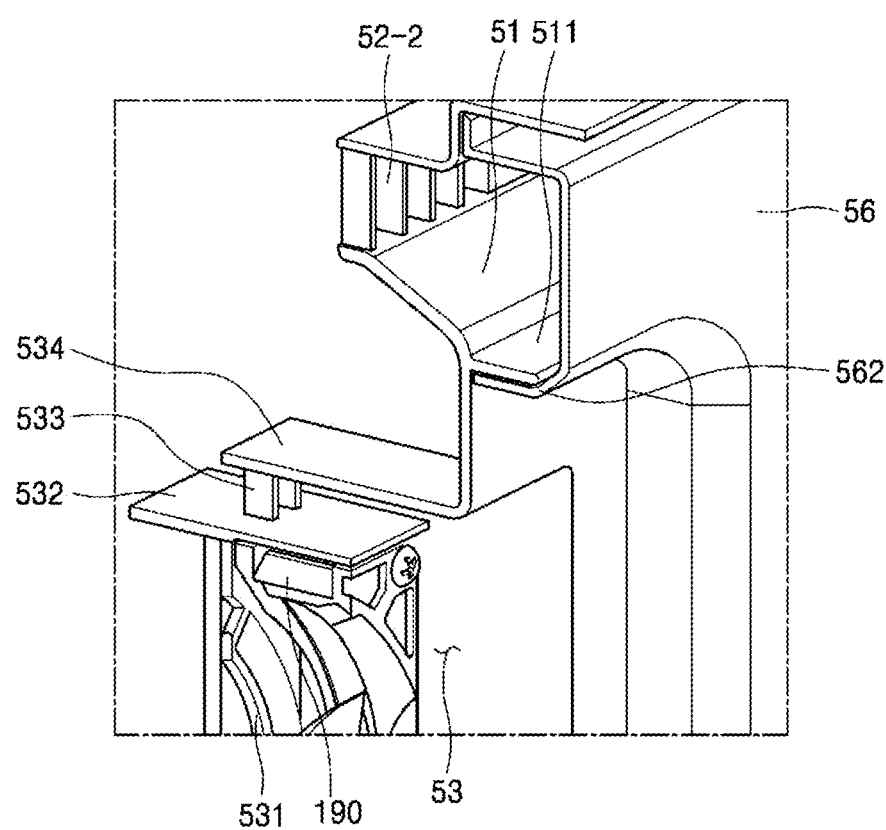

Hereinafter, an installation structure of the TEM assembly 100 will be described in detail with reference to FIGS. 16A to 17B. FIGS. 16A and 16B are cross-sectional views taken along line I-I of FIG. 6, and FIGS. 17A and 17B are enlarged perspective views of a portion J of FIG. 8 when viewed from the rear.

As described above, the grill fan assembly 50 includes the TEM accommodating part 53 which accommodates the TEM assembly 100. The TEM accommodating part 53 is provided in a shape protruding forward from the grill fan 51, and the TEM assembly 100 is fitted into the TEM accommodating part 53 behind the grill fan assembly.

Referring to FIG. 16A, a portion of the shroud 56 overlaps the rear of the TEM accommodating part 53 of the grill fan 51. More particularly, an abutting surface 561 of the shroud abuts and is fixed to the rear surface of the grill fan 51 which surrounds the TEM accommodating part 53. A TEM insertion hole 563 is provided around an inner edge of the abutting surface 561 of the shroud, and a portion opened by the TEM insertion hole 563 is a path which is in conjunction with the inner space of the TEM accommodating part 53 behind the grill fan assembly 50.

Figure 17A:
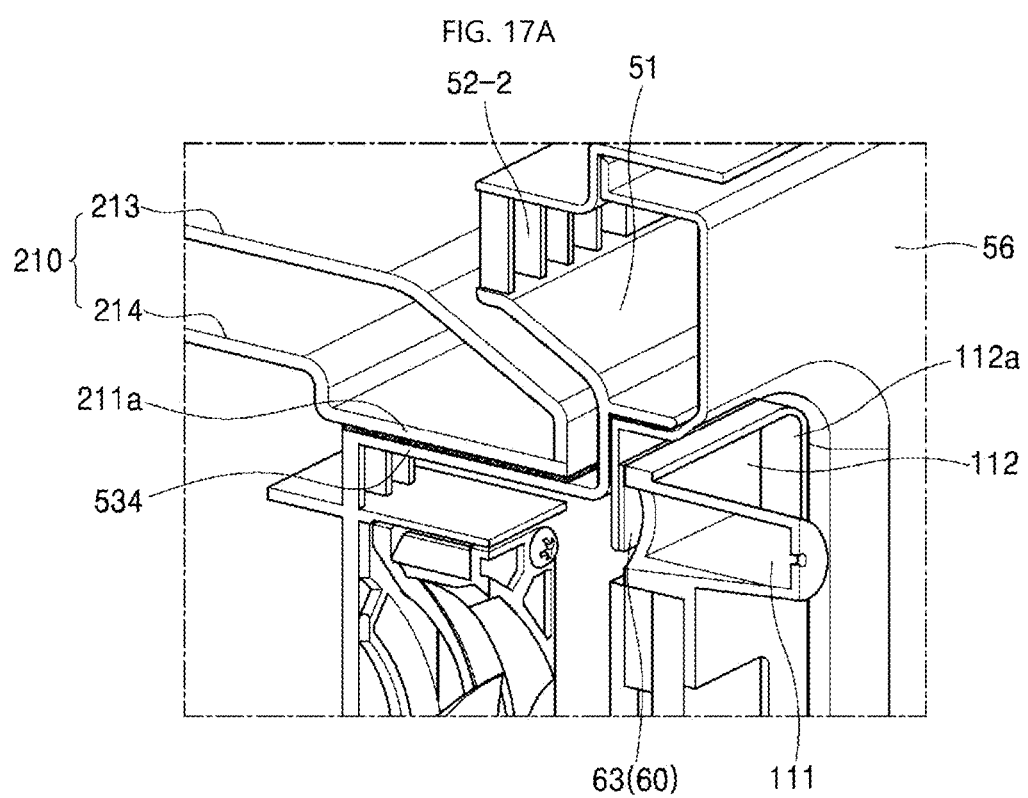

Referring to FIG. 17A, the above-described TEM assembly 100 is fixed at a position at which the rear surface of the grill fan 51 and the abutting surface 561 of the shroud 56 overlap. Generally, the grill fan 51 and the shroud 56 are made of an injection molded synthetic resin, and are manufactured in a plate form. The synthetic resin in a plate form is sufficient as a structure for partitioning a space. However, there is a concern that rigidity may be insufficient to fix a specific structure on a corresponding plate. However, according to the present invention, since the TEM assembly 100 is fixed at a position at which the rear surface of the grill fan 51 and the abutting surface 561 of the shroud overlap, rigidity for fixing and supporting the TEM assembly 100 may be sufficiently secured.

As a modified example, the TEM assembly 100 illustrated in each of FIGS. 16B and 17B may be in direct contact with the rear surface of the grill fan and fixed thereto. In the modified example, a structure in which the flange 112 of the TEM assembly 100 is directly fixed to the rear surface of the grill fan 51 is illustrated.

A rear rib 511 extending rearward is provided on the rear surface of the grill fan 51. The rear rib 511 is provided on an outer periphery of the rear surface of the grill fan 51 slightly spaced apart from the TEM accommodating part 53. More particularly, the rear rib 511 is formed at the position at which the rear surface of the grill fan and the abutting surface 561 of the shroud overlap, or is formed at a side farther outward from the TEM accommodating part 53 than a position at which the TEM assembly 100 is installed.

In addition, similarly, a rib abutting surface 562 extending rearward to come into contact with the inner surface of the rear rib 511 is provided on an outer circumferential surface of the abutting surface 561 of the shroud. That is, the abutting surface 561 and the rib abutting surface 562 are bent to form a stepped shape. Therefore, the abutting surface 561 of the shroud and the rib abutting surface 562 are brought into contact with the rear surface of the grill fan 51 and the rear rib 511 in an L shape.

In the rear rib 511 and the rib abutting surface 562, rigidity may be further secured due to a characteristic of the stepped shape and assembly of the TEM assembly 100 fixed to a rear surface of the abutting surface 561 of the shroud may be further facilitated. That is, when an outer edge of the flange 112 provided in the module housing 110 of the TEM assembly 100 is manufactured to be merged to some extent, that is, slightly, with an inside of the rib abutting surface 562, an outer circumferential surface of the flange 112 of the TEM assembly 100 is loosely fitted into the stepped shape by the rib abutting surface 562 when the TEM assembly 100 is fixed to the grill fan assembly 50, and thus the TEM assembly 100 may be easily fixed to the grill fan assembly 50 while accurately regulating a position of the TEM assembly 100. As illustrated in FIGS. 10, 17A, and 17B, when a bent surface 112a is provided to extend rearward from the outer edge of the flange 112, the bent surface 112a comes into contact with an inner circumferential surface of the rib abutting surface 562, and thus the position thereof is more securely regulated and rigidity of the flange 112 is reinforced.

The above-described spacer 111 may be fixed to the inner case 12 by a fixing means such as a screw or using a groove-boss press-fit method in a state in which the spacer 111 extends rearward from the flange 112 and comes into contact with the inner case 12 of the refrigerator main body 10. Therefore, the module housing 110 firmly fixes the TEM assembly 100 to both the grill fan assembly 50 and the inner case 12. Since the spacer 111 of the module housing 110 fixes the TEM assembly 100 in a state of being spaced apart from the inner case 12, heat radiation efficiency of the heat sink is increased and a working space sufficient for welding the inlet pipe and the outlet pipe of a refrigerant passing through the thermoelectric element to the refrigerant pipe of the refrigeration cycle cooling system 70 is secured, as described above.

The cooling fan 190 installed at a front-most portion of the TEM assembly 100 may be configured separately from the TEM assembly 100 by being fastened and fixed to the TEM accommodating part 53 of the grill fan 51, as in the embodiment of the present invention illustrated in the drawing, or may become one component of the TEM assembly 100 by being integrated with the TEM assembly 100 in such a manner that the cooling fan 190 is fixed to the cold sink 120 at a predetermined interval by a fastening means such as a screw. When the cooling fan 190 is rotated, the cooling fan 190 pressurizes air and allows the air to flow toward a front side, that is, toward the very low temperature freezer compartment 200. Therefore, air behind the cooling fan 190 is discharged forward by the cooling fan 190 so that a space behind the cooling fan 190 is re-filled with air in the very low temperature freezer compartment 200. Air re-filled in the TEM accommodating part 53 exchanges heat with the cold sink 120 and is cooled to a very low temperature.

According to the refrigerator having the very low temperature freezer compartment according to the present invention, the thermoelectric element 130 and the heat sink 150 of the TEM assembly 100 are disposed further rearward from a surface of the grill fan 51 forming the rear wall of the freezer compartment 40, and thus the heat generated in the thermoelectric element 130 may be intrinsically blocked from being introduced into the freezer compartment 40.

Referring to FIGS. 7, 10, and 16A to 17B, the space of the freezer compartment 40 is defined as a front space of the grill fan 51, and the very low temperature freezer compartment 200 is defined as an inner space distinguished by the grill fan 51, the very low temperature case 210, and the very low temperature compartment door 220. The TEM assembly 100 of the present invention is disposed at the rear of the very low temperature case 210. Specifically, the thermoelectric element 130 and the heat insulating material 140 of the TEM assembly 100 and the heat sink 150 located behind the heat insulating material 140 are located further rearward from a rear cross section (D-D of FIGS. 7 and 10) of the freezer compartment 40 defined by the grill fan 51. That is, the thermoelectric element 130 and the heat sink 150 located behind the thermoelectric element 130 are located between the rear of the grill fan 51 and the inner case 12. More particularly, the thermoelectric element 130 and the heat sink 150 located behind the thermoelectric element 130 are located behind the grill fan and are disposed in a heat exchange space (the freezer compartment which is a space defined separately from the freezer compartment) including an evaporator 77a.

According to an arrangement position of the TEM assembly 100, the heat generated in the heat-generating surface 130b and the heat sink 150 is fundamentally blocked from affecting a temperature of the space of the freezer compartment 40, and thus heat loss of the inner space of the freezer compartment 40 due to the thermoelectric element 130 may be prevented. That is, in the present invention, the TEM assembly 100 is installed in a space separated from the very low temperature freezer compartment installed in the freezer compartment by the TEM assembly 100 being installed behind the grill fan 51, which is a wall separating the freezer compartment from the freezer compartment, and thus heat loss of the freezer compartment may be prevented while very low temperature cooling is smoothly performed.

The accommodating groove 113 of the module housing 110 is provided to extend rearward relative to the flange 112. The flange 112 is fixed to the grill fan 51 defining a rear surface of the freezer compartment with the shroud 56 interposed therebetween. However, as described above, the thermoelectric element and the heat sink of the TEM assembly are preferably disposed in a separate space from the freezer compartment.

Accordingly, in the present invention, the accommodating groove 113 is formed to extend rearward relative to the flange 112, configurations of the assembly are accommodated in the accommodating groove 113 in the order of the heat sink, the thermoelectric element, and the cold sink, and thus the heat sink and the thermoelectric element are located at a rear of the space defined as the freezer compartment.

In contrast to the arrangement of the thermoelectric element and the heat sink, the very low temperature freezer compartment 200 is disposed inside the freezer compartment. The cold sink 120 of the TEM assembly 100 is also disposed in front of the rear cross section (D-D of FIGS. 7 and 10) of the freezer compartment 40. The cold sink 120 may be disposed in front of the rear cross section of the freezer compartment as a portion colder than the freezer compartment, and is preferably disposed as close as possible to the very low temperature freezer compartment 200 in terms of cooling of the very low temperature freezer compartment.

That is, according to the present invention, the very low temperature freezer compartment 200 and the cold sink 120 are disposed in front of the rear cross section of the freezer compartment defined by the grill fan, that is, in the freezer compartment, and the thermoelectric element 130 and the heat sink 150 are disposed behind the rear cross section of the freezer compartment, that is, in the freezer compartment.

FIG. 14 is a front perspective view illustrating a modified example of the TEM assembly according to the present invention, and FIG. 15 is a rear perspective view of the modified example of FIG. 14.

The modified example illustrated in FIGS. 14 and 15 is different from the TEM assembly of FIG. 13 in that two spacers 111 are provided at an upper portion of the TEM assembly. That is, according to the modified example, since there are three spaces which are not disposed in a straight line, a space fixing force for the inner case 12 may be further secured in comparison with the TEM assembly including only two spacers above and below.

Further, according to the modified example, holes or grooves are provided in the rear of the spacer, and protrusions which may be fitted to such holes or grooves are provided at the inner case 12 so that the spacer 111 may be fixed to the inner case 12 in a groove-boss press-fit method, which makes installation more convenient. This method may be a simpler method than a method of fastening the spacer and the inner case with a screw through a screw hole of the spacer 111 illustrated in FIGS. 17A and 17B.

Meanwhile, the very low temperature freezer compartment 200 may be installed in the refrigerator compartment 30. Referring to FIG. 21, a wall defining the rear boundary of the storage space of the refrigerator compartment 30 may be the inner case 12. Further, although not illustrated, a multi-duct for uniformly distributing cold air to the refrigerator compartment may form at least a portion of the wall defining the rear boundary of the storage space of the refrigerator compartment.

The space between the inner case 12 and the outer case 11 may be filled with a foam heat insulating material, and thus a space in which the thermoelectric module 100 may be disposed may be secured when the foam heat insulating material is foamed. The drain hole 536 through which defrosted water may be drained is formed when the foam heat insulating material is foamed. In addition, the refrigerant pipe connected to the heat sink 150 of the TEM assembly 100 may be filled with the foam heat insulating material while being embedded therein. Similarly, the embedded refrigerant pipe may be connected to the refrigerant inlet pipes 151 and 152 of the heat sink 150 by welding or the like in the process of installing the TEM assembly 100.

The flange 112 of the module housing 110 may be fixed to a front surface of the inner case 12 in the process of disposing the TEM assembly 100 at a proper position. The TEM accommodating part 53 manufactured with a separate part may be fixed to the front surface of the inner case 12. In this case, the TEM accommodating part 53 and the flange 112 of the module housing 110 may be fixed to the inner case 12 to overlap each other as illustrated. Although not illustrated, the TEM accommodating part 53 and the flange 112 of the module housing 110 may be fixed to the inner case 12 so as not to overlap each other. The TEM accommodating part 53 is integrated by being fixed to the inner case 12.

A rear surface 211-1 (see FIG. 6) of the very low temperature case 210 of the very low temperature freezer compartment 200 may be in close contact with the front of the inner case 12, which is a wall defining a rear surface of the storage space. The rear surface 211-1 being in close contact with the inner case includes all of a case in which the rear surface of the very low temperature case is in direct contact with the front surface of the inner case, a case in which the rear-surface of the very low temperature case is in direct contact with a surface of the TEM accommodating part 53 installed on the front surface of the inner case to come into contact the inner case, and the like.

An inner circumferential surface 211a of the opening 211 provided in the rear surface of the very low temperature case 210 may be in close contact with the outer circumferential surface 534 of the TEM accommodating part 53.

Even with the above-described structure, the thermoelectric element 130 and the heat sink 150 of the TEM assembly 100 are disposed further rearward from the wall (the inner case 12) defining the rear boundary D-D of the storage space (the refrigerator compartment 30) cooled by the refrigeration cycle cooling system, and thus the heat exchange pin 122 of the cold sink 120 is located in front of the rear boundary D-D while an influence of the heat generated in the TEM assembly 100 on the refrigerator compartment 30 is minimized so that cooling efficiency of the very low temperature freezer compartment 200 may be maintained to be high.

[Refrigeration Cycle Cooling System for Implementing Extremely Low Temperature of Very Low Temperature Freezer Compartment]

Figure 18:
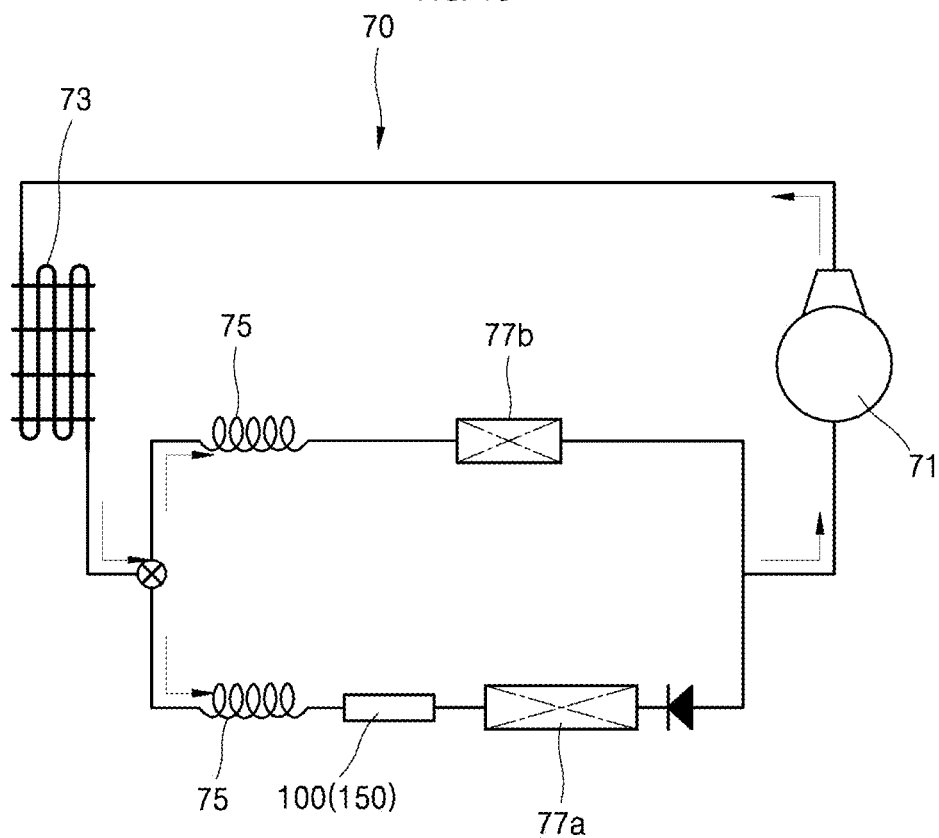
FIG. 18 is a view illustrating a refrigeration cycle applied to the refrigerator according to the present invention.
Figure 19:
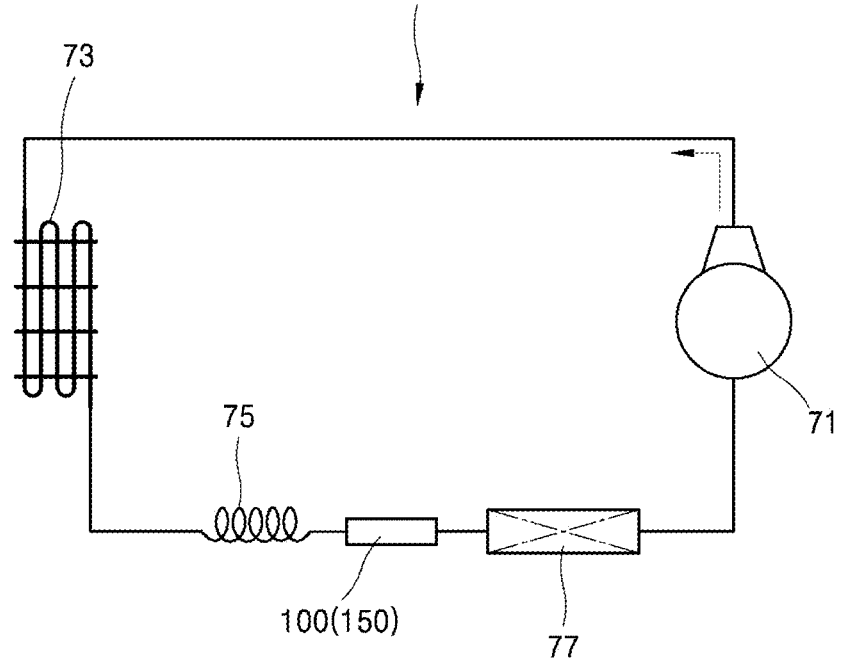
FIG. 19 is a view illustrating another embodiment of the refrigeration cycle applied to the refrigerator according to the present invention.

FIG. 18 is a view illustrating a refrigeration cycle applied to the refrigerator according to the present invention, and FIG. 19 is a view illustrating another embodiment of the refrigeration cycle applied to the refrigerator according to the present invention.

The refrigeration cycle cooling system 70 of the refrigerator according to the present invention is a device configured to discharge heat inside the freezer compartment outside the refrigerator via a refrigerant passing through a thermodynamic cycle of evaporation, compression, condensation, and expansion. The refrigeration cycle cooling system of the present invention includes the evaporator 77 in which a liquid phase refrigerant in a low-pressure atmosphere is evaporated by exchanging heat with air in the freezer compartment (the space between the grill fan assembly and the inner housing), the compressor 71 in which a gaseous refrigerant vaporized in the evaporator is pressurized and is discharged as a high temperature and high pressure gaseous refrigerant, the condenser 73 in which the high-temperature and high-pressure gaseous refrigerant discharged from the compressor exchanges heat with air outside the refrigerator (the machine compartment), is condensed, and heat is discharged therefrom, and the expansion device 75 such as a capillary tube in which the refrigerant condensed in the condenser 73 is lowered to be in a low temperature atmosphere. A low-temperature and low-pressure refrigerant in the liquid phase whose pressure is lowered in the expansion device 75 is introduced back into the evaporator.

According to the present invention, since the heat of the heat sink 150 of the TEM assembly 100 should be rapidly cooled, before a low-temperature and low-pressure refrigerant in the liquid phase whose pressure and temperature are lowered is introduced into the evaporator 77 after passing through the expansion device 75, the refrigerant is configured to first pass through the heat sink 150 of the TEM assembly 100.

Figure 20:
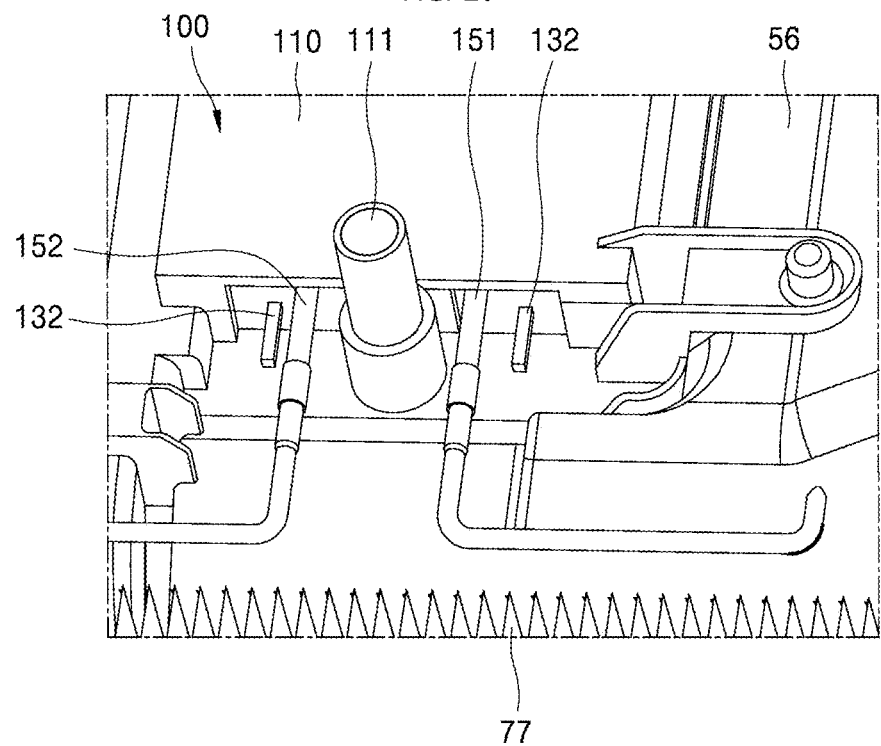
FIG. 20 is an enlarged perspective view illustrating a state in which a refrigerant pipe behind a capillary tube of a refrigeration cycle and a capillary tube in front of an evaporator are connected to a refrigerant inlet pipe (151) and a refrigerant outlet pipe (152) of a TEM assembly fixed to a grill fan assembly, respectively.

FIG. 20 is an enlarged perspective view illustrating a state in which a refrigerant pipe behind a capillary tube of a refrigeration cycle and a capillary tube in front of an evaporator are connected to the refrigerant inlet pipe 151 and the refrigerant outlet pipe 152 of the TEM assembly fixed to the grill fan assembly, respectively. As illustrated in FIG. 20, the refrigerant inlet pipe 151, which is exposed to behind the module housing through an open hole provided at a lower portion of the module housing 110 of the TEM assembly 100, and more particularly, at a lower portion of the accommodating groove, is connected to a refrigerant pipe of a refrigeration cycle passing through an expansion device such as a capillary tube. The refrigerant outlet pipe 152 exposed behind the module housing is connected to a refrigerant pipe introduced into the evaporator. Therefore, a refrigerant passing through the capillary tube is introduced into the heat sink 150 through the refrigerant inlet pipe 151 to cool or absorb heat of the heat-generating surface of the thermoelectric element 130, and passes through the refrigerant outlet pipe 152 to be introduced into the evaporator 77.

The liquid phase refrigerant passes through the heat sink 150 while rapidly absorbing heat generated by the heat-generating surface 130b of the thermoelectric element 130 via the heat sink 150 using a heat conduction method. Therefore, the heat of the heat sink 150 is rapidly cooled by the refrigerant circulating through the heat sink.

This process will be described in detail with reference to FIG. 18. The compressor 71 pressurizes the low-temperature and low-pressure gaseous refrigerant to discharge a high-temperature and high-pressure gaseous refrigerant. Heat is generated in the condenser 73 and the refrigerant is condensed, that is, is liquefied. As described above, the compressor 71 and the condenser 73 are disposed in the machine compartment of the refrigerator.

The high-temperature and high-pressure liquid refrigerant which is passed through the condenser 73 and liquefied is introduced into the evaporator 77 while being depressurized through the expansion device 75 such as a capillary tube. In the evaporator 77, the refrigerant absorbs the surrounding heat and evaporates. According to the embodiment of the present invention illustrated in FIG. 18, the refrigerant passing through the condenser 73 is branched to a refrigerator compartment evaporator 77b or a freezer compartment evaporator 77a. In this case, the heat sink 150 of the TEM assembly 100 is provided in front of the freezer compartment evaporator 77a on a flow path of the refrigerant and is disposed behind the expansion device 75.

The very low temperature freezer compartment 200 is a space in which a temperature of −50° C. should be maintained, and the heat-generating surface 130b of the thermoelectric element 130 should be maintained to be very cool so that the heat-absorbing surface 130a is smoothly maintained to be cooler than the heat-generating surface 130b. Therefore, the heat sink 150 through which the refrigerant passes is disposed in front of the freezer compartment evaporator 77a on the flow path of the refrigerant so that a coldest state may be maintained. Specifically, since the heat sink 150 is in direct contact with the thermoelectric element 130 and absorbs the heat generated by the thermoelectric element 130 via a heat conductor such as a metal in a conductive manner, the heat-generating surface 130b of the thermoelectric element 130 may be reliably cooled.

Meanwhile, when it is desired that the very low temperature freezer compartment 200 be used at a temperature of −20° C. like a typical freezer compartment without being cooled at a very low temperature of −50° C., the very low temperature freezer compartment 200 may be used as a general freezer compartment only by not supplying power to the thermoelectric element 130. In this case, when power is not applied to the thermoelectric element 130, heat absorption and heat generation do not occur in the heat sink of the thermoelectric element. Therefore, the refrigerant passing through the heat sink 150 is introduced into the freezer compartment evaporator 77*a* in as a liquid refrigerant that does not absorb heat and is not evaporated.

A hole through which defrosted water generated by the above-described defrosting of the cold sink 120 is drained, that is, the drain hole 536, is provided in the TEM accommodating part 53 and is in conjunction with the space between the grill fan 51 and the shroud 56 and/or the space between the grill fan assembly 50 and the inner case 12. Therefore, when the cooling fan 190 is operated without power being supplied to the thermoelectric element 130, cool air in the space between the grill fan 51 and the shroud 56 and/or the space between the grill fan assembly 50 and the inner case 12 may be introduced into the TEM accommodating part 53 and discharged into the very low temperature freezer compartment 200 by the cooling fan 190. Further, in order to promote introduction of cool air in the space between the grill fan 51 and the shroud 56 and/or the space between the grill fan assembly 50 and the inner case 12 into the TEM accommodating part 53, an additional fan (not illustrated) may be further provided. In addition, a damper structure may be added in order to selectively supply air cooled by the refrigeration cycle cooling system 70 when the very low temperature freezer compartment is used as a general freezer compartment.

That is, cool air generated in a refrigeration cycle cooling system using a general compression method is supplied to the freezer compartment and the refrigerator compartment of the refrigerator of the present invention. When the very low temperature freezer compartment is operated, the refrigerant passing through the expansion device 75 passes through the heat sink 150 of the TEM assembly 100, rapidly absorbs the heat generated in the heat-generating surface of the thermoelectric element 130, rapidly discharges the heat generated in the heat-generating surface of the thermoelectric element 130, and then enters the evaporator 77*a*.

The refrigeration cycle cooling system 70 in FIG. 19, which is a modified example of the refrigeration cycle cooling system in FIG. 18, is different from the refrigeration cycle cooling system 70 illustrated in FIG. 18 in that the refrigeration cycle cooling system 70 has a structure in which cooling is performed in the freezer compartment and the refrigerator compartment using one evaporator 77 without a separate evaporator 77*b* for the refrigerator compartment. That is, there is no difference between the refrigeration cycle structure of FIG. 19 and that of FIG. 18 except that there is no need for a three-way valve, a backflow prevention valve, or the like, and there is no branch portion of the expansion device 75 and the evaporator 77*b* on the refrigerating compartment. That is, according to the present invention, even in the case of a refrigeration cycle in which cooling is performed using one evaporator 77, the refrigerant is disposed so as to pass through the heat sink 150 of the TEM assembly 100 and exchange heat therewith at a position corresponding to the front of the evaporator 77 or a rear of the expansion device 75, and thus the cooling of the heat-generating surface 130*b* of the thermoelectric element 130 may be performed with the highest priority.

[Operation of Very Low Temperature Freezer Compartment]

The very low temperature freezer compartment 200 may store food at a temperature lower than −20° C., which is a temperature of a general freezer compartment, and may be cooled down to a temperature of −50° C. However, such an extremely low temperature is intended to generate a quenching environment to prevent water from being drained from cells or separating the cells, as described above, and a storage temperature may be higher than the temperature of the quenching environment (−50° C.) after being quenched once.

Therefore, storing food after the food is quenched at the temperature of the quenching environment may result in energy consumption being increased. Therefore, in the present invention, food may be quenched at a temperature of −50° C. at the beginning of cooling and then maintained at a slightly higher temperature (e.g., −45 to 40° C.) than the temperature of −50° C., and thus power consumption may be reduced while freshness of a stored product is maintained.

Such operating conditions may be changed in various ways. For example, food may be quenched at a temperature of −50° C. at the beginning and then maintained at a slightly higher temperature (e.g., −35 to 30° C.) than the temperature of −50° C., and thus freshness of a stored product may be secured through the quenching, cooling time may be reduced, and power consumption may be further reduced.

Further, the very low temperature freezer compartment may be operated using a concept of a fresh compartment in which an initial quenching temperature is set to about −35° C. without setting a temperature of −50° C., and then the temperature is continuously maintained at about −35° C.

An operation mode may be selected by a user. The selection of a very low temperature may be attributed to a characteristic of the TEM. That is, in a cooling method of a compressor and a refrigerant, it is difficult to abruptly change an operation mode and to finely control a temperature. However, since the TEM may finely control the temperature of the very low temperature freezer compartment according to a current applied thereto, the above-described various operation modes are possible.

[Arrangement and Operation of TEM Assembly]

The TEM assembly 100 is accommodated in the TEM accommodating part 53 provided in the grill fan assembly 50. The cooling fan 190 is provided in front of the TEM assembly 100 in the TEM accommodating part. The cooling fan 190 is closely fixed to a rear surface of a front surface of the TEM accommodating part 53. In the present invention, a structure in which the cooling fan 190 is fixed to the front surface of the TEM accommodating part 53 by screws being passed through four corners thereof is illustrated.

In the cooling fan 190 in the form of a box fan, a forwardly flat circular air discharge surface 191 is provided, and the air discharge surface 191 is in contact with the rear surface of the grill portion 531 provided on the front surface of the TEM accommodating part 53. The grill portion 531 having a size corresponding to that of the air discharge surface 191 prevents air discharged from the cooling fan 190 from being discharged by the fan blade of the cooling fan 190 while the air discharged from the cooling fan 190 is smoothly discharged to protect the fan. The cold sink 120 provided in front of the TEM assembly 100 is disposed behind the cooling fan 190 in the form of a box fan.

According to the present invention, the discharge guide 532 in the form of a duct protruding forward from the grill portion 531 is formed at an edge of the grill portion 531 in contact with the air discharge surface 191 of the cooling fan 190. The discharge guide 532 is illustrated as being formed to have a square cross-sectional shape corresponding to that of the cooling fan 190 in the form of a square box fan.

However, as described above, the shape of the discharge guide 532 may be variously modified.

An end of the discharge guide 532 faces the open groove 227 provided in the rear of the very low temperature tray 226. Therefore, the cool air discharged through the discharge guide 532 is introduced into the very low temperature tray 226, strongly flows forward, and uniformly cools the very low temperature freezing space.

The above-described suction portion 533, which is open in the forward direction, is disposed on substantially the same plane as the air discharge surface, and the discharge guide 532 is disposed between the air discharge surface 191 of the cooling fan and the suction portion 533. When the suction portion is disposed in front of the air discharge surface, the air discharged from the air discharge surface is immediately re-suctioned into the suction portion. Conversely, when the suction portion is disposed behind the air discharge surface, a suction force of the suction portion is weakened and a circulating force of the cool air circulating in the very low temperature freezer compartment the inner space is weakened.

Further, the suction portion 533, which is open in the forward direction, is disposed at each of an upper portion and a lower portion of the air discharge surface. A suction portion 5331 located at the upper portion of the cooling fan 190 absorbs heat from the very low temperature freezer compartment 200 and suctions raising air. The suction portion 5332 located at the lower portion of the cooling fan 190 is a path in which cool air discharged and supplied toward a front surface of the very low temperature tray 226 passes through the very low temperature tray 226 and is re-suctioned into the TEM accommodating part 53 through a space h between a bottom surface of the very low temperature tray and a bottom surface of the very low temperature case 210.

The space h between the bottom surface of the very low temperature tray and the bottom surface of the very low temperature case preferably ranges from 4 mm to 7 mm. When the space h is smaller than 4 mm, flow resistance of the cool air is increased, and the circulating flow of the cold air is lowered. Conversely, when the space h is greater than 7 mm, the circulating flow of the cold air hardly is improved, and a storage capacity volume of the very low temperature tray 226 is reduced.

The air suctioned into the inner space of the TEM accommodating part 53 through the suction portion 533 flows toward a negative pressure portion generated on the air suction surface of the cooling fan 190 in the middle and comes into contact with the heat exchange pin 122 of the cold sink 120 to exchange heat therewith. Since the suction portions are provided at the upper and lower sides, the flow of the cold air mainly occurs in the vertical direction even in the TEM accommodating part. Correspondingly, the heat exchange pin 122 of the cold sink 120 is formed in a vertically elongated shape.

[Sealing Structure of Grill Fan Assembly for Operating Very Low Temperature Freezer Compartment]

Figure 22:
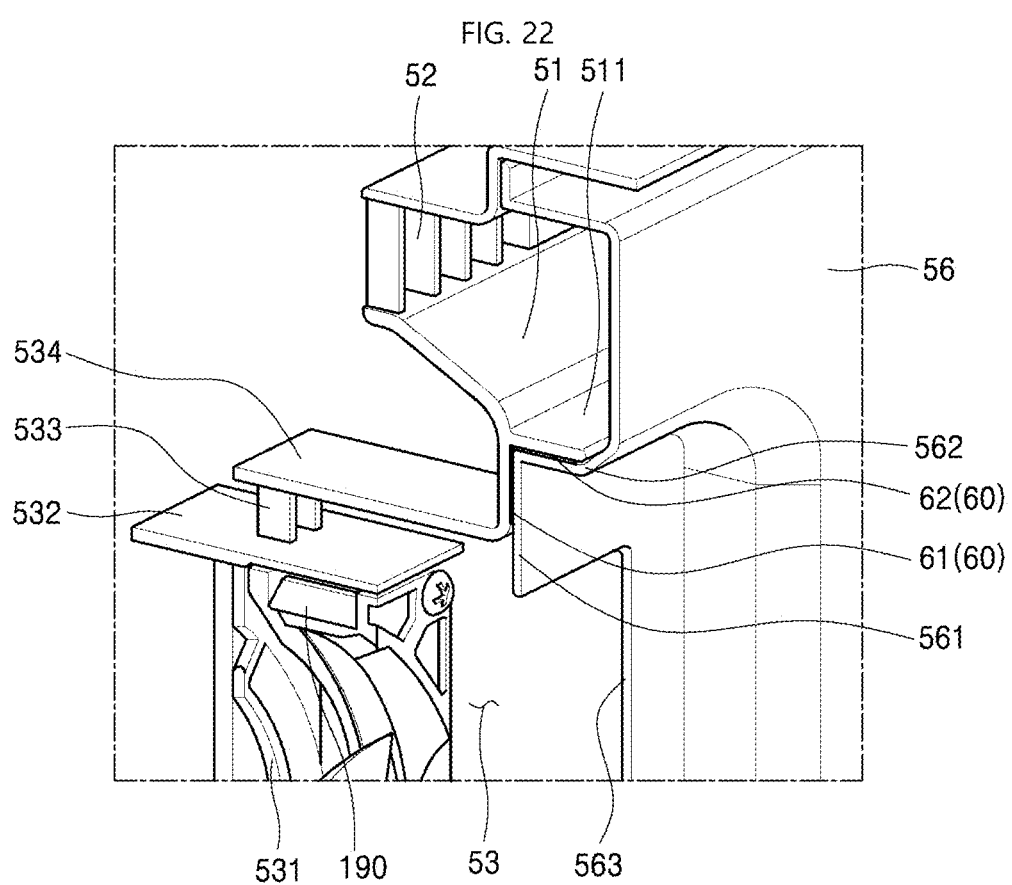
FIG. 22 is an enlarged cross-sectional view taken along line I-I of FIG. 6.
Figure 23:
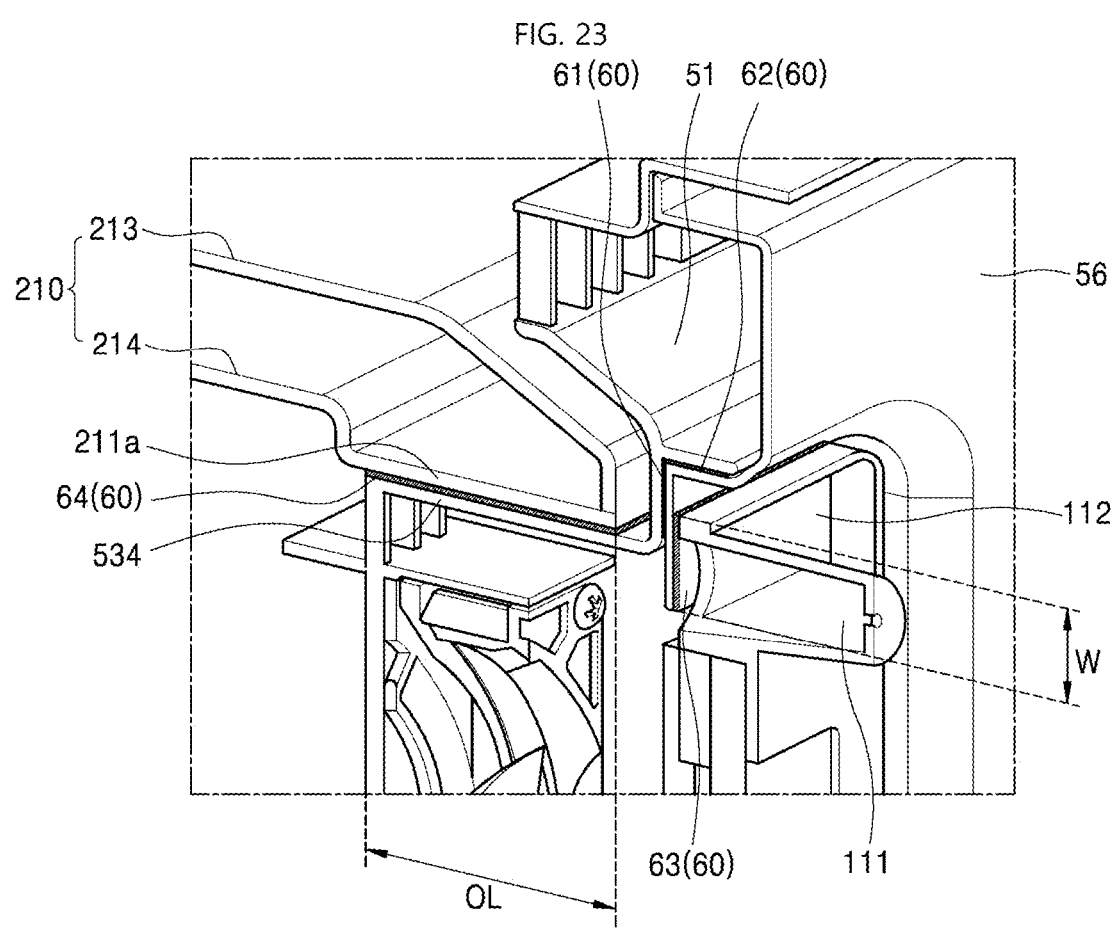
FIG. 23 is an enlarged perspective view of the portion J of FIG. 8 when viewed from the rear.
Figure 24:
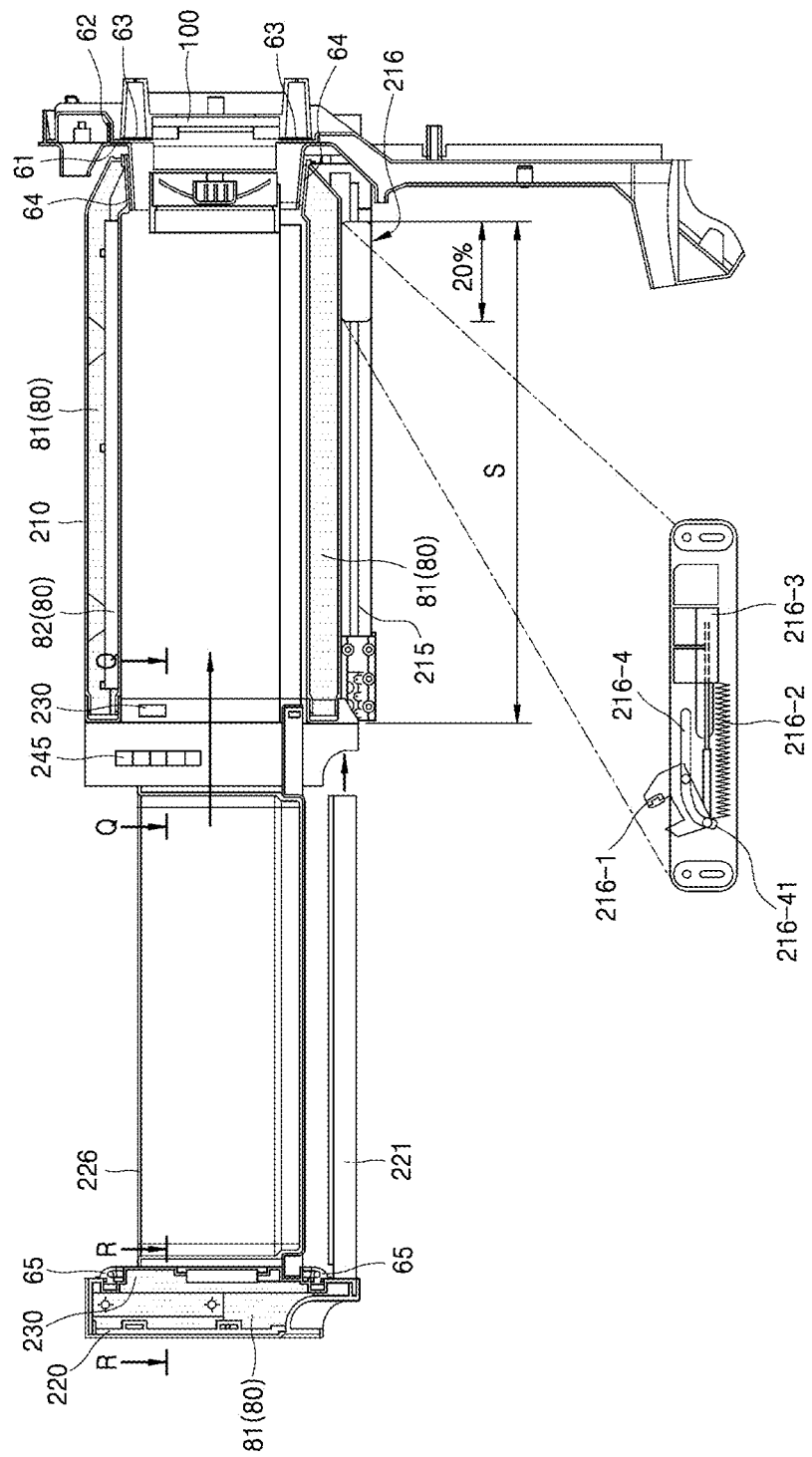
FIG. 24 is a side cross-sectional view illustrating a state in which a very low temperature compartment door and a very low temperature tray are withdrawn from the very low temperature case assembled in the grill fan assembly.
Figure 25:
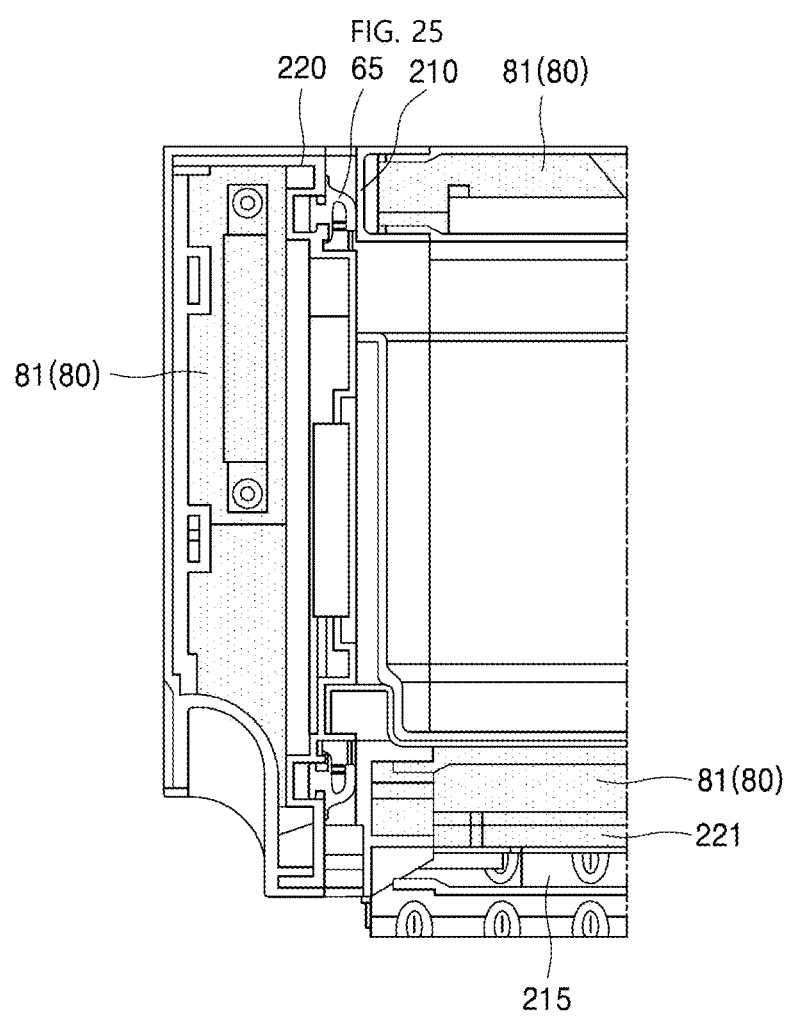
FIG. 25 is an enlarged side cross-sectional view illustrating a state in which the very low temperature compartment door in the very low temperature case of FIG. 24 is closed.

FIG. 22 is an enlarged cross-sectional view taken along line I-I of FIG. 6, FIG. 23 is an enlarged perspective view of the portion J of FIG. 8 when viewed from the rear, FIG. 24 is a side cross-sectional view illustrating a state in which a very low temperature compartment door and a very low temperature tray are withdrawn from the very low temperature case assembled in the grill fan assembly, FIG. 25 is an enlarged side cross-sectional view illustrating a state in which the very low temperature compartment door is closed in the very low temperature case of FIG. 24, and FIG. 26 illustrates cross-sectional views taken along lines Q-Q and R-R of FIG. 24.

As described above, the grill fan assembly 50, and more particularly, the grill fan 51, includes the TEM accommodating part 53 which accommodates the TEM assembly 100. The TEM accommodating part 53 is provided in a form protruding forward from the grill fan 51, and the TEM assembly 100 is fitted to the TEM accommodating part 53 in behind the grill fan assembly.

A portion of the shroud 56 overlaps the rear of the TEM accommodating part 53 of the grill fan 51. More particularly, the abutting surface 561 of the shroud is in contact with the rear surface of the grill fan 51, which surrounds the TEM accommodating part 53, and is fixed thereto. The TEM insertion hole 563 is provided at an inner edge of the abutting surface 561 of the shroud, and a portion opened by the TEM insertion hole 563 is a path in conjunction with the inner space of the TEM accommodating part 53 from the rear of the grill fan assembly 50.

The above-described TEM assembly 100 is fixed at a position at which the rear surface of the grill fan 51 and the abutting surface 561 of the shroud 56 overlap. The grill fan 51 and the shroud 56 are usually made of an injection molded synthetic resin, and are manufactured in a plate form. The synthetic resin in the plate form is sufficient as a structure for partitioning a space. However, there is a concern in that rigidity may be insufficient to fix a specific structure on a corresponding plate. However, according to the present invention, since the TEM assembly 100 is fixed at the position at which the rear surface of the grill fan 51 and the abutting surface 561 of the shroud overlap, rigidity for fixing and supporting the TEM assembly 100 may be sufficiently secured.

However, as described above, since the grill fan 51 and the abutting surface 561 of the shroud are in contact with each other at a periphery of the TEM accommodating part 53, a gap defined by these abutting surfaces is in conjunction with the TEM accommodating part 53, and as a result, the gap is a path in which the TEM accommodating part 53 in conjunction with the very low temperature freezing space is in conjunction with a general freezing space. Therefore, the gap between the grill fan 51 and the abutting surface of the shroud may be a path through which the cool air in the very low temperature freezing space leaks into the general freezing space.

Accordingly, in the present invention, a first sealant 61 is pressed and interposed between the rear surface of the grill fan 51 of the periphery of the TEM accommodating part 53 and the abutting surface 561 of the shroud overlapping the rear surface. Ethylene propylene diene monomer (EPDM) rubber having excellent sealing performance may be applied as the sealant. A material of the sealant may be applied to second to fourth sealants, which will be described below, as well as the first sealant.

Meanwhile, since a temperature difference of about 30° C. is generated between the very low temperature freezing space and the general freezing space, a sealing force should be sufficiently secured and a sufficient overlapping width is required even when a sealant is interposed therebetween. On the other hand, in order to maintain such an overlapping width, an overlapping region of the grill fan and the abutting surface of the shroud should be secured as a predetermined width or more, and the overlapping region is a factor which occupies a volume of the freezer compartment or the very low temperature freezer compartment.

In consideration of this fact, in the present invention, the rear rib 511 extending rearward from the rear surface of the grill fan 51 is formed. The rear rib 511 is provided in an outer periphery of the rear surface of the grill fan 51 to be slightly spaced apart from the TEM accommodating part 53. More particularly, the rear rib 511 is formed at a side farther outward from the TEM accommodating part 53 than the position at which the rear surface of the grill fan and the abutting surface 561 of the shroud overlap.

In addition, similarly, the rib abutting surface 562 extending rearward to be in contact with the inner surface of the rear rib 511 is provided on the outer circumferential surface of the abutting surface 561 of the shroud. That is, the abutting surface 561 and the rib abutting surface 562 are bent to form a stepped shape. Therefore, the abutting surface 561 of the shroud and the rib abutting surface 562 are brought into contact with the rear surface of the grill fan 51 and the rear rib 511 in an L shape. Also, a second sealant 62 is interposed and pressed between the rear rib 511 and the rib abutting surface 562.

In this manner, when the first sealant and the second sealant are respectively interposed between two abutting portions of the bent shape, a sealing force may be more reliably secured. The first sealant and the second sealant may be separately manufactured and interposed as illustrated. Further, the first sealant and the second sealant may be integrally manufactured to have an L-shaped cross section, and may be interposed and pressed between the bent abutting surfaces.

In the rear rib 511 and the rib abutting surface 562, a sealing force may be secured even in a narrow space, and the assembly of the TEM assembly 100 fixed to the rear surface of the abutting surface 561 of the shroud due to a characteristic of the stepped shape may be further facilitated. That is, when the outer edge of the flange 112 provided in the module housing 110 of the TEM assembly 100 is manufactured to be merged to some extent, that is, slightly, with the inside of the rib abutting surface 562, the outer circumferential surface of the flange 112 of the TEM assembly 100 is loosely fitted into the stepped shape by the rib abutting surface 562 when the TEM assembly 100 is fixed to the grill fan assembly 50, and thus the TEM assembly 100 may be easily fixed to the grill fan assembly 50 while a position of the TEM assembly 100 is accurately regulated.

That is, the stepped structure has an advantage of providing ease of assembly of the TEM assembly 100 as well as ensuring the sealing force of the gap between the grill fan and the shroud.

Further, a gap may also be generated in the overlapping region in which the abutting surface 561 of the shroud and the flange 112 of the module housing 110 are in contact with each other, and cool air in the very low temperature freezing space may be discharged into the general freezing space through the gap. In consideration of this fact, in the present invention, a third sealant 63 is disposed in the overlapping region in which the abutting surface 561 of the shroud and the flange 112 of the module housing 110 overlap. In this case, in order to secure a sealing force, a width of the third sealant 63 should be sufficiently secured.

However, according to the present invention, since the spacer 111 extending rearward from the flange 112 of the module housing 110 is provided and a rear end of the spacer 111 is supported by the inner case 12 located behind the grill fan assembly 50, an adhesion force between the rear surface of the abutting surface 561 and a front surface of the flange 112 may be further secured due to the spacer 111.

In the present invention, a width w of the third sealant 63 ranges from 5 mm to 15 mm. When the width of the third sealant 63 is less than 5 mm, there is a problem in that the sealing force is significantly reduced. In the present invention, the sealing force may be secured even when the width of the sealant is only about 5 mm, which is a result of a supporting force of the above-described spacer being added thereto. When the width of the third sealant is more than 15 mm, there is little improvement in the sealing force for preventing leakage of cool air and only a dimension is unnecessarily increased.

According to the above-described structure, sealing of each of the components provided for fixing the TEM assembly 100 to the grill fan assembly 50 and a shape portion thereof may be secured, and the assembly of the TEM assembly 100 to the grill fan assembly 50 may be facilitated.

For reference purposes, the accommodating groove 113 is provided to extend rearward relative to the flange 112. The flange 112 is fixed to the grill fan 51 defining a rear surface of the freezer compartment with the shroud 56 interposed therebetween. However, as described above, the thermoelectric element and the heat sink of the TEM assembly are preferably disposed in a separate space from the freezer compartment.

Accordingly, in the present invention, the accommodating groove 113 is formed to extend rearward relative to the flange 112, configurations of the assembly are accommodated in the accommodating groove 113 in the order of the heat sink, the thermoelectric element, and the cold sink, and thus the heat sink and the thermoelectric element are located behind the space defined as the freezer compartment.

The above-described structure may also be applied to the installation structure of the TEM assembly 100, as illustrated in FIG. 21. Since the inner space of the TEM accommodating part 53 should be isolated from the storage space of the refrigerator compartment 30, a sealant may be interposed between the rear surface of the flange 112 of the module housing 110 and the front surface of the inner case 12.

Similarly, a sealant may also be interposed between a portion in which the rear surface of the TEM accommodating part 53 of FIG. 21 is in contact with the inner case 12, and more particularly, the front surface of the flange 112 of the module housing 110 in close contact with the inner case 12, and the inner case 12.

A width of the sealant may also range from 5 to 15 mm like the above-described width w.

[Sealing Structure of Very Low Temperature Freezer Compartment]

Hereinafter, a gap which is generated in the assembled structure of the very low temperature freezer compartment of the present invention and the sealing structure between the very low temperature case and the very low temperature compartment door will be described with reference to FIGS. 23 to 26.

As described above, the TEM accommodating part 53 protruding forward is provided in the grill fan 51, and the very low temperature case 210, which defines an overall exterior of the very low temperature freezer compartment 200, is coupled to the TEM accommodating part 53. The guide rails 212, which guide a sliding movement forward and backward via auxiliary rails 15-1 provided on the side surface of the inner case 12 and the side surface of the partition wall 42, are provided on both side surfaces of the very low temperature case 210. The opening 211, which is open to accommodate the TEM accommodating part 53, is provided on the rear surface of the very low temperature case 210. Therefore, when the very low temperature case 210 is pushed rearward from the front of the freezer compartment 40 while the guide rails 212 are coupled to each other to be guided by the rails or the auxiliary rail, the TEM accommodating part 53 is fitted into the opening 211 such that the inner circumferential surface 211a of the opening 211 and the outer circumferential surface 534 of the TEM accommodating part 53 face each other.

The inner circumferential surface 211a has a predetermined depth and overlaps the outer circumferential surface 534 of the TEM accommodating part 53 to surround the TEM accommodating part 53. The inner circumferential surface 211a and the outer circumferential surface 534 have a predetermined pressure and are in close contact with each other.

According to the present invention, a fourth sealant 64 is interposed and pressed between the inner circumferential surface 211a and the outer circumferential surface 534. When the fourth sealant 64 is interposed and pressed between the inner circumferential surface 211a and the outer circumferential surface 534 such that the inner circumferential surface 211a and the outer circumferential surface 534 are coupled to each other, the very low temperature case 210 is fixed to the TEM accommodating part 53 by the inner circumferential surface 211a and the outer circumferential surface 534 being fastened to each other. Therefore, according to the present invention, when the fourth sealant 64 is interposed between the inner circumferential surface 211a and the outer circumferential surface 534 and the very low temperature case 210 is pushed rearward, the very low temperature case and the TEM accommodating part are firmly fixed to each other, and leakage of cool air in the very low temperature freezing space toward the freezer compartment through the gap between the very low temperature case and the TEM accommodating part may be prevented.

As described above, although the inner circumferential surface 211a has a slight inclination relative to the outer circumferential surface 534, unlike the above-described other sealing portion, a sealing direction and an assembly direction of the overlapping region of the inner circumferential surface 211a and the outer circumferential surface 534 are substantially orthogonal to each other. Therefore, a compression force between the inner circumferential surface 211a and the outer circumferential surface 534 may be less than a compression force between the rear surface of the grill fan and the abutting surface 561 of the shroud and a compression force between the rear surface of the abutting surface and the flange 112 of the TEM assembly 100 as described above.

In consideration of this fact, in the present invention, a length OL of the fourth sealant disposed in the overlapping region of the inner circumferential surface 211a and the outer circumferential surface 534 may range from 30 mm to 40 mm. When an overlapping length (the length of the fourth sealant) is less than 30 mm, a sealing force is insufficient, and thus cool air in the very low temperature freezing space may be discharged into the freezer compartment. When the overlapping length is 30 mm or more, the sealing force for preventing the discharge of the cool air may be sufficiently secured, and when the overlapping length is more than 40 mm, the sealing force is sufficiently secured but the overlapping length is unnecessarily increased. When the overlapping length is increased, the very low temperature freezing space is occupied by the increased overlapping length, and thus a volume capacity thereof is reduced.

The structure in which the TEM accommodating part protrudes forward from the grill fan has an effect of securing an overlapping range for the very low temperature case as described above, and has an effect of preventing loss of the cool air by allowing the cold sink of the TEM assembly accommodated in the TEM accommodating part to be disposed close to the very low temperature freezing space.

In addition, according to the present invention, a rear surface of a periphery of the opening of the very low temperature case 210 may be in contact with a front surface of the periphery of the TEM accommodating part of the grill fan. Accordingly, there is an effect in that a sealing force is improved via the L-shaped sealing structure being disposed between the grill fan and the shroud described above. Similarly, as the case in which the sealant is interposed between the inner circumferential surface 211a and the outer circumferential surface 534, the sealant may be interposed and pressed between the rear surface 211-1 of the periphery of the opening and a front surface of the grill fan.

Further, as described above, the inner circumferential surface 211a includes a surface inclined outwardly in the rearward direction, the outer circumferential surface 534 also includes a surface inclined outwardly in the rearward direction in a shape corresponding to the inner circumferential surface, and thus assembly of the very low temperature case to the TEM accommodating part may be smoothly performed. Such a tapered angle may range from about 1 to 5°.

The above-described structure may be applied to an installation structure of the very low temperature freezer compartment 200 illustrated in FIG. 21. That is, the sealant may be pressed and interposed even in a portion in which the rear surface of the very low temperature case 210 is in contact with the inner case 12, and the sealant may be pressed and interposed between the inner circumferential surface of the opening of the very low temperature case 210 and the outer circumferential surface of the TEM accommodating part 53.

In other words, the very low temperature freezer compartment and the rear wall may be reliably sealed through a structure in which the rear wall of the storage space cooled by the refrigeration cycle cooling system is in contact with the rear surface of the very low temperature freezer compartment and the sealant is pressed and interposed therebetween, and/or a structure in which the outer circumferential surface of the TEM accommodating part provided on the rear wall is in contact with the inner circumferential surface of the opening provided in the rear surface of the very low temperature freezer compartment and the sealant is pressed and interposed therebetween.

The space between the outer case 213 of the very low temperature case 210, which defines a rear surface and upper, lower, left, and right surfaces of the very low temperature freezing space, and the inner case 214 is filled with the heat insulating material 80 as described above, and thus an exchange of heat between the very low temperature freezing space and the freezer compartment may be prevented.

Meanwhile, an inside of the very low temperature compartment door 220 which shields the open front of the very low temperature case 210 is also filled with the heat insulating material 80 such as the foam heat insulating material 81, and thus an exchange of heat between the very low temperature freezing space and the freezer compartment may be prevented. However, since the very low temperature compartment door 220 is configured to open and close the front of the very low temperature case, a gap may be generated between the very low temperature compartment door 220 and a front end of the very low temperature case 210, and heat may be introduced into the very low temperature case or cool air inside the very low temperature case may be discharged into the freezer compartment through the gap.

In consideration of this fact, in the present invention, a gasket 65 made of silicone is installed on an outer edge of a rear surface of the very low temperature compartment door 220 to be in close contact with a front surface of the very low temperature case. However, unlike a gasket installed in a conventional refrigerator door, since the above-described gasket 65 is a −50° C. environment inside the very low temperature freezing space and a −20° C. environment outside the very low temperature freezing space, an elastic force of the gasket may be lowered and the cool air in the very low temperature freezing space may be leaked.

In consideration of this fact, in the present invention, a compression structure is further provided to further provide a compression force for pushing the very low temperature compartment door 220 toward the very low temperature case 210.

Briefly, the compression structure may be the freezer compartment door 22. That is, in a state in which the freezer compartment door 22 is closed, a structure such as the door basket 27 installed inside the freezer compartment door 22 pushes the very low temperature compartment door 220 rearward, and thus the very low temperature compartment door 220 may be pressed toward the very low temperature case 210.

Further, the compression structure may include a magnetic substance 230 such as a magnet embedded in a portion at which the very low temperature case 210 and the very low temperature compartment door 220 face each other. Referring to FIG. 8, the front end of the very low temperature case 210 is in the form of a rectangular frame, and the outer edge of the rear surface of the very low temperature compartment door 220 faces the front end of the very low temperature case. Therefore, as illustrated in FIG. 24, when the magnetic substance 230 is embedded in all or a portion of the front end of the very low temperature case 210 along an edge thereof and the magnetic substance 230 is embedded in the very low temperature compartment door 220 at a position corresponding to a position at which the magnetic substance of the very low temperature case is embedded, the very low temperature compartment door 220 is pressed against the very low temperature case 210 by attraction between the two magnetic substances.

The compression structure may be a structure in which a protrusion 240 and a locking groove 245 respectively provided in the very low temperature case 210 and the very low temperature compartment door 220 are engaged. Referring to FIGS. 24 and 26 which is a cross-sectional view of the very low temperature case and the very low temperature compartment door without the very low temperature tray when viewed from the front, outwardly protruding protrusions 240 are provided on both sides of the very low temperature compartment door 220, and locking grooves 245 into which the protrusions are fitted may be formed inside protrusions 219 protruding forward from the very low temperature case 210. Therefore, when the very low temperature compartment door 220 is pushed and closed, the locking groove 245 and the protrusion 240 may be maintained in an engaged state so that the compression force for pushing the very low temperature compartment door 220 toward the very low temperature case 210 may be maintained.

In the embodiment of the present invention, a structure in which the protrusions 240 are provided on the very low temperature compartment door 220 and the locking grooves 245 are installed at the very low temperature case 210. However, the locking groove 245 may be provided in the very low temperature compartment door 220 and the protrusions 240 may be provided in the very low temperature case 210. In addition, the structure of the locking groove and the protrusion is not limited to the illustrated form, the protrusions may be deformed in various forms such as a saw or a hook, and the locking groove may have a shape in which the protrusion may be locked in correspondence with the shape of the protrusion.

A pushing structure of the door basket of the freezer compartment door, a structure of the magnetic substance, and a structure of the above-described protrusions and locking grooves may be applied individually or in combination to the refrigerator. A structure of a damping closure 216, which will be described below, may also be applied thereto.

Referring to FIG. 24, an outer rail guide 221 is installed below the very low temperature compartment door 220 to extend rearward. In addition, the rail guide 221 is mounted below the very low temperature case 210, and an outer rail 215 is installed to allow the rail guide to slide back and forth. The rail guide 221 and the outer rail 215 may be disposed outside the very low temperature freezing space, that is, in the space of the freezer compartment, and may be provided with a metal material having high rigidity.

Since the very low temperature freezing space is an extremely low temperature environment of −50° C., when the rail and the rail guide, which are made of a metal material having good thermal conductivity, are disposed in the very low temperature freezing space of the very low temperature case 210, moisture which is absorbed from food while cool air is circulated may stick to the rail and the rail guide of the metal material unlike the very low temperature compartment door 220 and the very low temperature tray 226, which are made of a synthetic resin material. This directly affects an opening and closing operation of the very low temperature compartment door. Also, it is difficult to defrost water adhered to the rail and the rail guide of the metal material.

However, when the rail and the rail guide are made of a synthetic resin material, the synthetic resin material may be deformed into a fragile state in the extremely low temperature environment, and thus the rail and the rail guide may be damaged when subjected to an external force and friction.

As described above, in the present invention, the rail is not disposed in the very low temperature freezing space, the outer rail 215 of the metal material is installed on a bottom portion of the very low temperature case as described above, and the outer rail guide 221 is installed below the rear surface of the very low temperature compartment door 220. Therefore, the outer rail 215 and the outer rail guide 221 support a loading and unloading operation of the very low temperature tray 226. Meanwhile, when the rail is disposed outside the very low temperature freezing space as described above, the very low temperature freezing space may be further secured.

However, in order to prevent sagging of the very low temperature tray by a self-weight of the very low temperature tray 226 and a self-weight of food contained in the very low temperature tray 226, an additional sub rail and sub rail guide of a synthetic resin material may be further provided on a side surface or a bottom surface of the very low temperature tray. In the embodiment of the present invention, in order to prevent such sagging and to maintain a space between the very low temperature tray and the bottom of the very low temperature freezer compartment, a structure of ribs 214b and 226a described above with reference to FIG. 9 has been illustrated.

According to the present invention, the damping closure 216 provided on the outer rail 215 or the outer rail guide 221 may be further provided as a pressing structure of the very low temperature compartment door with respect to the very low temperature case. In the embodiment of the present invention, a structure in which the damping closure 216 is installed behind the outer rail 215 is illustrated. For example, when the very low temperature compartment door 230 is closed to some extent, for example, about 80% of a total inlet stroke S (see FIG. 24), an end of the outer rail guide 221 reaches the damping closure 216, and the outer rail guide 221 is moved rearward by a contractive force of an elastic body 216-2 configured of a tension spring in the damping closure while being locked and fixed to a locking bracket 216-1 of the damping closure 216 even when a user does not exert an external force thereon. A guide protrusion 216-11 of the locking bracket 216-1 is fitted into a guide slot 216-4 and is moved along the guide slot. In this case, since the elastic body may be subjected to a damping force by a viscous oil 216-3 in the damping closure, the rail guide 221 may be slowly pulled rearward at a controlled speed, and the very low temperature compartment door may be brought into close contact with the very low temperature case by an urging force of the elastic body. Since the viscous oil is in an atmosphere of the freezer compartment, it is preferable for oil having an appropriate viscosity at a temperature of the corresponding atmosphere to be used as the viscous oil.

Conversely, when the very low temperature compartment door 230 is opened, the very low temperature compartment door 230 should be pulled at about 20% of total outlet stroke at the beginning such that the urging force of the elastic body 216-2 is overcome and the elastic body 216-2 shrinks. When pulling force is more than 20% of the total outlet stroke, the outer rail guide 221 may be easily released and unloaded from the locking bracket 216-1 of the damping closure 216. When the outer rail guide 221 is released from the locking bracket of the damping closure 216, the locking bracket is positioned at a locking position 216-41 of the guide slot 216-4 and stays at the corresponding position.

In addition to the damping closure 216 having the above-described structure, any closure may be applied to the present invention as long as it is installed on the outer rail or the outer rail guide and has a structure that can elastically urge the outer rail guide rearward.

According to the present invention, it should be apparent that it is also easy to assemble various components for implementing the very low temperature freezer compartment while preventing leakage of cold air in the very low temperature freezing space toward the freezer compartment.

In the embodiment of the present invention, a structure in which the TEM assembly 100 is disposed at the rear of the freezer compartment 40 and in the rear of the very low temperature freezer compartment 200 is illustrated. However, the TEM assembly 100 is not limited to such a position. For example, the TEM assembly 100 may be embedded in an upper portion of the inner case 12 of the freezer compartment to be located above the very low temperature freezer compartment 200. Since the heat sink 150 of the TEM assembly 100 allows the refrigerant of the refrigeration cycle cooling system 70 of the refrigerator to flow into the heat sink to be cooled using heat conduction, there is no need to be in contact with air. Therefore, a structure in which the TEM assembly 100 is embedded in the upper portion of the inner case 12 of the freezer compartment may also be applied to the present invention.

According to the present invention, an extremely low temperature can be smoothly implemented and maintained by all gaps around a very low temperature freezing space through which it is possible for a very low temperature freezing space to be in conjunction with a freezing space of a general freezer compartment being thoroughly sealed.

According to the present invention, a refrigerator can have a structure in which a TEM assembly is easily assembled and also reliably sealed.

According to the present invention, assembly and sealing of a very low temperature case and a grill fan assembly is simply and reliably performed, and sealing of the very low temperature case and a very low temperature compartment door, which performs opening and closing, is reliably performed, and thus very low temperature freezing can be implemented and maintained.

In addition to the effects described above, specific effects of the present invention have been described in the above detailed description of the embodiments of the invention.

While the present invention has been described with reference to the illustrated drawings, the present invention is not limited to the disclosed embodiments and the drawings. It should be clear to those skilled in the art that various modifications may be made within the scope of the invention. In addition, although operational effects according to the configuration of the present invention have not been explicitly described while explaining the embodiments of the present invention, it should be appreciated that effects predictable through the corresponding configuration can also obtained.

What is claimed is:

1. A refrigerator comprising:
   a freezer compartment;
   a grill plate located at a first side of the freezer compartment;
   a low temperature case located in the freezer compartment, the low temperature case being positioned at a first surface of the grill plate;
   a thermoelectric element module (TEM) assembly coupled to a second surface of the grill plate and located at a position corresponding to the low temperature case, the TEM assembly being configured to supply cool air to the low temperature case;
   a TEM accommodating part that is coupled to the grill plate and accommodates the TEM assembly;
   a shroud coupled to the grill plate and configured to distribute cool air supplied to the freezer compartment; and
   a first sealant is applied between the grill plate and the shroud and surrounds the TEM accommodating part,
   wherein the shroud comprises an abutting surface that is coupled to the second surface of the grill plate and faces the TEM accommodating part,
   wherein the shroud defines a TEM insertion hole in communication with an interior area of the TEM accommodating part, and
   wherein the first sealant is applied between the second surface of the grill plate and the abutting surface of the shroud.

2. The refrigerator of claim 1, wherein the TEM assembly comprises:
   a cold sink;
   a thermoelectric element disposed rearward relative to the cold sink in a direction toward the second surface of the grill plate;

a heat sink disposed rearward relative to the thermoelectric element;

a heat insulating material disposed between the cold sink and the heat sink;

a module housing that accommodates and supports at least one of the cold sink, the thermoelectric element, the heat insulating material, or the heat sink; and a flange that extends outward from the module housing and is coupled to the abutting surface of the shroud.

3. The refrigerator of claim 2, wherein the TEM assembly further comprises:

a spacer coupled to the flange and protrudes from the flange and configured to maintain a space between the grill plate and an inner case of the refrigerator.

4. The refrigerator of claim 2, further comprising a second sealant that couples the TEM assembly to the shroud and is applied between the flange and the abutting surface.

5. The refrigerator of claim 4, wherein the flange comprising a coupling portion that overlaps with the abutting surface, and wherein a width of the coupling portion of the flange is between 5 and 15 mm.

6. A refrigerator comprising:

a freezer compartment;

a grill plate located at a first side of the freezer compartment;

a low temperature case located in the freezer compartment, the low temperature case being positioned at a first surface of the grill plate;

a thermoelectric element module (TEM) assembly coupled to a second surface of the grill plate and located at a position corresponding to the low temperature case, the TEM assembly being configured to supply cool air to the low temperature case;

a TEM accommodating part that is coupled to the grill plate and accommodates the TEM assembly;

a shroud coupled to the grill plate and configured to distribute cool air supplied to the freezer compartment; and a first sealant is applied between the grill plate and the shroud and surrounds the TEM accommodating part, wherein the grill plate comprises a rear rib that is disposed at the second surface of the grill plate and extends rearward relative to an outer periphery of the TEM accommodating part, and wherein the shroud comprises a rib abutting surface that extends rearward relative to the outer periphery of the TEM accommodating part and is in contact with the rear rib.

7. The refrigerator of claim 6, wherein the first sealant is applied between the rear rib of the grill plate and the rib abutting surface of the shroud to thereby couple the shroud to the grill plate.

8. The refrigerator of claim 6, wherein the TEM assembly comprises:

a cold sink;

a thermoelectric element disposed rearward relative to the cold sink in a direction toward the second surface of the grill plate;

a heat sink disposed rearward relative to the thermoelectric element;

a heat insulating material disposed between the cold sink and the heat sink;

a module housing that accommodates and supports at least one of the cold sink, the thermoelectric element, the heat insulating material, or the heat sink; and a flange that extends outward from the module housing, wherein an outer edge of the flange is in contact with the rib abutting surface.

9. A refrigerator comprising:

a freezer compartment;

a grill plate located at a first side of the freezer compartment;

a low temperature case located in the freezer compartment, the low temperature case being positioned at a first surface of the grill plate;

a thermoelectric element module (TEM) assembly coupled to a second surface of the grill plate and located at a position corresponding to the low temperature case, the TEM assembly being configured to supply cool air to the low temperature case;

a TEM accommodating part that is coupled to the grill plate and accommodates the TEM assembly;

a shroud coupled to the grill plate and configured to distribute cool air supplied to the freezer compartment; and a first sealant is applied between the grill plate and the shroud and surrounds the TEM accommodating part, wherein the TEM accommodating part protrudes from the first surface of the grill plate toward the freezer compartment, and wherein the low temperature case defines an opening that receives the TEM accommodating part.

10. The refrigerator of claim 9, wherein the low temperature case and the TEM accommodating part of the grill plate are attached to each other by a sealant.

11. The refrigerator of claim 9, wherein a peripheral surface of the opening is in contact with and coupled to a peripheral surface of the TEM accommodating part by a sealant.

12. The refrigerator of claim 9, wherein the low temperature case and the grill plate are attached to each other by a sealant.

13. The refrigerator of claim 9, wherein the opening of the low temperature case surrounds an outer circumferential surface of the TEM accommodating part, and wherein the low temperature case is coupled to the TEM accommodating part by a sealant disposed between an inner circumferential surface of the opening and the outer circumferential surface of the TEM accommodating part.

14. The refrigerator of claim 13, wherein the low temperature case comprises a first inclined surface that is disposed outside of the opening and extends toward the first surface of the grill plate, and wherein the outer circumferential surface of the TEM accommodating part comprises a second included surface that faces the first inclined surface.

15. The refrigerator of claim 14, wherein the first inclined surface of the low temperature case defines a groove that receives a portion of the second included surface of the TEM accommodating part.

16. The refrigerator of claim 9, wherein the low temperature case defines has a case opening at a side of the low temperature case, the case opening being positioned away from the grill plate, and wherein the refrigerator further comprises:

a compartment door configured to open and close the case opening of the low temperature case; and a gasket that is configured to cover a gap between the compartment door and the low temperature case.

17. The refrigerator of claim 16, further comprising a refrigerator door configured to open and close the freezer compartment, wherein the refrigerator door is configured to, based on closing the freezer compartment, press the compartment door and the gasket.

18. The refrigerator of claim 9, wherein the TEM assembly comprises:
   a cold sink located at a first side of the grill plate;
   a thermoelectric element located at a second side of the grill plate opposite to the first side of the grill plate;
   a heat sink located at the second side of the grill plate;
   a heat insulating material disposed between the cold sink and the heat sink; and
   a module housing that accommodates and supports at least one of the cold sink, the thermoelectric element, the heat insulating material, or the heat sink.

19. The refrigerator of claim 18, wherein the cold sink has a first end located adjacent to the grill plate.

* * * * *